(12) United States Patent
Zeulner et al.

(10) Patent No.: US 12,552,105 B2
(45) Date of Patent: Feb. 17, 2026

(54) ALIGNMENT OF ENERGY BEAMS IN ADDITIVE MANUFACTURING SYSTEMS AND MACHINES

(71) Applicants: General Electric Company, Schenectady, NY (US); Concept Laser GmbH, Lichtenfels (DE)

(72) Inventors: Fabian Zeulner, Lichtenfels (DE); David Scott Simmermon, Felicity, OH (US); Laura L. Banks, West Chester, OH (US)

(73) Assignees: General Electric Company, Evendale, OH (US); Concept Laser GmbH, Lichtenfels (DE)

( * ) Notice: Subject to any disclaimer, the term of this patent is extended or adjusted under 35 U.S.C. 154(b) by 0 days.

(21) Appl. No.: 17/361,782

(22) Filed: Jun. 29, 2021

(65) Prior Publication Data
US 2022/0410488 A1    Dec. 29, 2022

(51) Int. Cl.
*B29C 64/393*      (2017.01)
*B29C 64/153*      (2017.01)
(Continued)

(52) U.S. Cl.
CPC .......... *B29C 64/393* (2017.08); *B29C 64/153* (2017.08); *B29C 64/282* (2017.08);
(Continued)

(58) Field of Classification Search
CPC ... B29C 64/393; B29C 64/282; B29C 64/153; B33Y 10/00; B33Y 30/00; B33Y 50/02; G02B 7/181; G02B 7/028
See application file for complete search history.

(56) References Cited

U.S. PATENT DOCUMENTS

| | | | |
|---|---|---|---|
| 4,618,759 A | 10/1986 | Muller et al. | |
| 6,462,301 B1 | 10/2002 | Scott et al. | |

(Continued)

FOREIGN PATENT DOCUMENTS

| | | |
|---|---|---|
| CN | 107276548 A | 10/2017 |
| DE | 3406677 A1 | 9/1985 |

(Continued)

OTHER PUBLICATIONS

Beresnev et al., Development of Adaptive Fiber Collimators for Conformal Fiber-Based Beam Projection Systems, Society of Photo-Optical Instrumentation Engineers (SPIE), Atmospheric Optics: Models, Measurements, and Target-in-the-Loop Propagation II, vol. 7090, Aug. 2008, 10 Pages.

(Continued)

*Primary Examiner* — Galen H Hauth
*Assistant Examiner* — John Robitaille
(74) *Attorney, Agent, or Firm* — Wood Herron & Evans LLP

(57) ABSTRACT

An additive manufacturing system may include an irradiation device configured to emit an energy beam having a manufacturing power level selected to additively manufacturing a three-dimensional object by irradiating a powder material, and a controller configured to perform one or more beam alignment operations when irradiating the powder material. The irradiation device may include a beam source, one or more beam positioning elements, a beam splitter configured to split a measurement beam from the energy beam, and one or more beam sensors configured to determine one or more parameters of the measurement beam. The one or more beam alignment operations may include determining position information of the energy beam based on the one or more parameters of the measurement beam, and aligning the energy beam with an optical axis of the irra- (Continued)

diation device by adjusting a position of the one or more beam positioning elements based on the position information.

15 Claims, 12 Drawing Sheets

(51) Int. Cl.
| | |
|---|---|
| *B29C 64/282* | (2017.01) |
| *B33Y 10/00* | (2015.01) |
| *B33Y 30/00* | (2015.01) |
| *B33Y 50/02* | (2015.01) |

(52) U.S. Cl.
CPC .............. *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 6,911,644 | B2 | 6/2005 | Doh et al. |
| 10,751,835 | B2 | 8/2020 | Grapov et al. |
| 2008/0015553 | A1 | 1/2008 | Zacharias |
| 2017/0341180 | A1* | 11/2017 | Zediker ................. B29C 64/268 |
| 2018/0207750 | A1 | 7/2018 | Carter |
| 2018/0345412 | A1* | 12/2018 | Van Vaerenbergh .. B33Y 30/00 |
| 2020/0094472 | A1 | 3/2020 | Brown et al. |
| 2021/0387284 | A1 | 12/2021 | Holfelder et al. |

FOREIGN PATENT DOCUMENTS

| | | |
|---|---|---|
| DE | 20320269 U1 | 4/2004 |
| EP | 3277483 A1 | 2/2018 |
| JP | 2006049606 A | 2/2006 |
| JP | 2009078277 A * | 4/2009 |
| JP | 6512466 B2 | 5/2019 |
| KR | 100562397 B1 | 3/2006 |
| WO | WO2016/205805 A1 | 12/2016 |
| WO | WO2018234984 A1 | 12/2018 |
| WO | WO2019226463 A1 | 11/2019 |

OTHER PUBLICATIONS

Boege et al., NIF Pointing and Centering Systems and Target Alignment Using a 351nm Laser Source, UCRL-JC-125776, Lawrence Livermore National Laboratory, Paris France, Oct. 1996, 14 Pages.

Chow et al., High Performance Automatic Gain Control Circuit for Communication Applications, Taiwan-Republic of China, 5 Pages. Retrieved on Mar. 31, 2021 from Webpage: https://citeseerx.ist.psu.edu/viewdoc/download?doi-10.1.1.413.563&rep=rep1&type=pdf.

Daranciang, Kinematic Mirror Mounts with Piezoelectric Adjusters, ThorLabs, Sep. 20, 2013, 5 Pages. Retrieved Oct. 2, 2020 from https://www.thorlabs.com/newgrouppage9.cfm?objectgroup_id=231.

Dataray Inc., BeamMap2/BeamR2 Pulsed Laser Procedure, Redding CA, 4 Pages.

Dataray Inc., LensPlate 2 for BeamR2/BeamMap2, Redding CA, 3 Pages.

Dataray Inc., M-Squared Measurement Systems, Redding CA, 4 Pages.

Dataray Inc., WinCamD-LCM, Redding CA, 5 Pages.

Edmund Optics, Simplifying Laser Alignment, 2 Pages.

Fuada et al., Automatic Gain Control Circuit for Mobility Visible Light Communication System using LM13700, Proceedings of International Symposium on Electronics and Smart Devices (Isesd), PC5-3, Dec. 30, 2017, 7 Pages.

Heintzmann, Appendix A: Practical Guide to Optimal Alignment, Fluorescence Microscopy: From Principles to Biological Applications, Wiley-VCH Verlag GmbH & Co., 2013, pp. 393-401.

Heintzmann, Appendix B: Practical Guide to Optimal Alignment, Fluorescence Microscopy: From Principles to Biological Applications, Wiley-VCH Verlag GmbH & Co., 2013, pp. 463-471.

Macgregor et al., Real-time Profiling for Focusing, M2, Divergence & Alignment, Multi-plane Beam Profiling Speeds Development & Production, DataRay Inc., 8 Pages.

Newport, Optical Mirror Mount Technology Guide, Resources, Technical Notes, Opto-Mechanics, 5 Pages.

Newport, Optical Mirror Mounts, 1 page.

Pi, Automation Platforms for Laser Material Processing, Precision, Throughput, Synchronized Motion, 28 Pages.

Pi, Piezoelectric Actuators, Components, Technologies, Operation, Germany, 74 Pages.

Pi, PiezoMike Miniature Linear Actuator, With Kinematic Mirror Mount, N-480, Mar. 2021, 7 Pages.

Schouten et al., Design of a Kinematic Coupling for Precision Applications, Precision Engineering, vol. 20, 1997, pp. 46-52.

Slocum, Kinematic Couplings: A Review of Design Principles and Applications, Sep. 30, 2009, 34 Pages.

Thorlabs, Kinematic Mirror Mounts with Piezoelectric Adjusters, Optomechanical Mounts, Optical Mirror Mounts, Motorized Mirror Mounts, Kinematic Mirrors, 5 Pages. https://www.thorlabs.com/newgrouppage9.cfm?objectgroup_ID=231.

Thorlabs, Position Sensing Detectors, 3 Pages. Retrieved Mar. 31, 2021 from Webpage: https://www.thorlabs.com/newgrouppage9.cfm?objectgroup_id=4400.

* cited by examiner

ALIGNMENT OF ENERGY BEAMS IN ADDITIVE MANUFACTURING SYSTEMS AND MACHINES

FIELD

The present disclosure generally pertains to irradiation devices for irradiating powder material to additively manufacture three-dimensional objects, such as irradiation devices used in powder bed fusion processes.

BACKGROUND

Three dimensional objects may be additively manufactured using a powder bed fusion process in which an energy beam is directed onto a powder bed to melt and/or sinter sequential layers of powder material. The properties of the three dimensional object formed by melting and/or fusing the powder material may depend at least in part on one or more parameters of the energy beam, including, for example, the extent to which an irradiation device provides and/or maintains good alignment of the energy beam with an optical axis of the irradiation device. Accordingly, it would be welcomed in the art to provide improved additive manufacturing systems and machines, including improved energy beam systems and irradiation devices that provide for one or more parameters of an energy beam to be adjusted and/or controlled, including alignment of the energy beam with an optical axis of the irradiation device.

BRIEF DESCRIPTION

Aspects and advantages are set forth in part in the following description, or may be apparent from the description, or may be learned through practicing the presently disclosed subject matter.

In one aspect, the present disclosure embraces systems for additively manufacturing a three-dimensional object. An exemplary system may include an irradiation device configured to emit an energy beam having a manufacturing power level selected to additively manufacturing a three-dimensional object by irradiating a powder material, and a controller configured to perform one or more beam alignment operations when irradiating the powder material with the energy beam to additively manufacture the three-dimensional object. The irradiation device may include a beam source, one or more beam positioning elements disposed downstream from the beam source, a beam splitter disposed downstream from the one or more beam positioning elements and configured to split a measurement beam from the energy beam, and one or more beam sensors configured to determine one or more parameters of the measurement beam, with the measurement beam propagating along a measurement path to the one or more beam sensors, and the energy beam propagating along an irradiation path to the powder material. The one or more beam alignment operations may include determining with the one or more beam sensors, position information of the energy beam based at least in part on the one or more parameters of the measurement beam, and aligning the energy beam at least partially with an optical axis of the irradiation device at least in part by adjusting a position of the one or more beam positioning elements based at least in part on the position information determined with the one or more beam sensors.

In another aspect, the present disclosure embraces methods of additively manufacturing a three-dimensional object. An exemplary method may include irradiating a powder material with an energy beam emitted from an irradiation device, with the energy beam having a manufacturing power level selected to additively manufacturing a three-dimensional object, and performing, with a controller, one or more beam alignment operations when irradiating the powder material with the energy beam to additively manufacture the three-dimensional object, with the one or more beam alignment operations determined based at least in part on one or more parameters of a measurement beam. The irradiation device may be configured as described herein. The one or more beam alignment operations may include operations as described herein.

In yet another aspect, the present disclosure embraces computer-readable media. An exemplary computer-readable medium may include computer-executable instructions, which when executed by a processor associated with an additive manufacturing machine, causes the additive manufacturing machine to perform a method in accordance with the present disclosure.

These and other features, aspects and advantages will become better understood with reference to the following description and appended claims. The accompanying drawings, which are incorporated in and constitute a part of this specification, illustrate exemplary embodiments and, together with the description, serve to explain certain principles of the presently disclosed subject matter.

BRIEF DESCRIPTION OF THE DRAWINGS

A full and enabling disclosure, including the best mode thereof, directed to one of ordinary skill in the art, is set forth in the specification, which makes reference to the appended Figures, in which.

Figure 1:
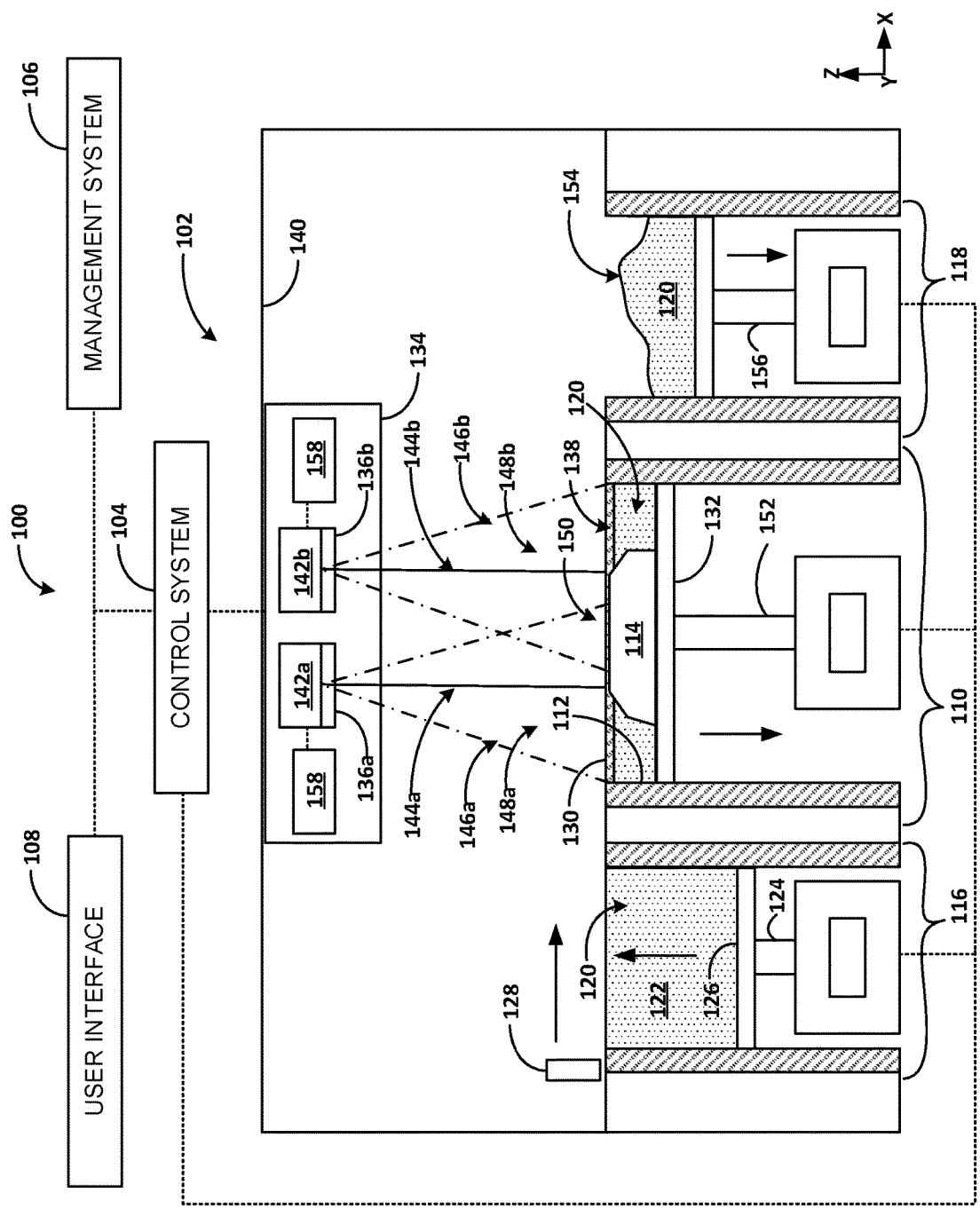
FIG. 1 schematically depicts an exemplary additive manufacturing system or machine.

Repeat use of reference characters in the present specification and drawings is intended to represent the same or analogous features or elements of the present disclosure.

DETAILED DESCRIPTION

The presently disclosed subject matter will now be described in further detail, in some instances with reference to one or more of the drawings. Examples are provided by way of explanation and should not be interpreted as limiting the present disclosure. In fact, it will be apparent to those skilled in the art that various modifications and variations can be made in the present disclosure without departing from the scope of the present disclosure. For instance, features illustrated or described in one portion of the present disclosure can be used with features illustrated or described in another portion of the present disclosure, including with modification and variations thereof. It is intended that the present disclosure covers such modifications and variations as come within the scope of the appended claims and their equivalents.

The present disclosure generally provides systems and apparatuses for additively manufacturing three-dimensional objects that include an irradiation device configured to perform beam alignment operations, including calibrating alignments prior to additively manufacturing at least a portion of a three-dimensional object and/or manufacturing alignment during additively manufacturing at least the portion of the three-dimensional object. The beam alignment operations may be performed with one or more beam positioning elements configured to adjust an axial and/or angular orientation of the energy beam based at least in part on sensor information from one or more beam sensors configured to determine sensor information from a measurement beam extracted or split from the energy beam. The presently disclosed systems and apparatuses allow for beam alignments to be performed using the same energy beam as used to additively manufacture three-dimensional objects. Adjustments to the alignment of the energy beam may be performed prior to commencing additive manufacturing, as well as during the additive manufacturing process, allowing, for example, adjustments to compensate for changing operating conditions and/or changing operating environments. For example, changes in temperature of various components of an irradiation device may be compensated for over the course of an additive manufacturing process by performing beam alignment operations in accordance with the present disclosure. Advantageously, the presently disclosed systems and apparatuses can be utilized to mitigate or eliminate possible misalignments of the energy beam that might otherwise be caused by changes in temperature of various components of the irradiation device, including, for example, by providing adjustments to the alignment of the energy beam to compensate for gradual changes in temperature over the course of an additive manufacture process.

The capability to obtain sensor information from the energy beam used to additively manufacture three-dimensional objects, rather than from a separate energy beam, provided by the presently disclosed systems and apparatuses may be realized by the configuration, arrangement, and selection of particular optical elements as described herein. For example, as described herein, a beam splitter may be configured to split or extract from an energy beam, a measurement beam with an intensity and/or power level that is suitable for use with a beam sensor without overloading the beam sensor both during a calibrating alignment and a manufacturing alignment, for example, even though the energy beam may have a power level during a manufacturing alignment that is at least one order of magnitude larger than a power level of the energy beam during a calibrating alignment. Additionally, or in the alternative, a beam sensor may be configured to provide a signal within a suitable amplitude for measurement beams across a wide range of intensity and/or power levels. For example, a beam sensor may provide automatic gain control, and/or a beam sensor may provide a plurality of sensor elements configured for use with different power levels. The presently disclosed subject matter also provides for automatic beam alignment by beam positioning elements that include a kinematic optical element integrated into an irradiation device. The beam positioning elements 202 may provide linear displacements at nano-scale increments, realized by a combination of piezoelectric actuators and kinematic couplings that provide a level of sensitivity commensurate with nano-scale position sensing capabilities realized by exemplary beam sensors.

Exemplary irradiation devices may be configured to align the energy beam used to additively manufacture three-dimensional objects with an optical axis of the irradiation device, and/or to maintain alignment with the optical axis, based at least in part on sensor data obtained from a measurement beam extracted or split from the energy beam. As used herein, the term "optical axis" refers to a path passing through various optical elements of an irradiation device that coincided with an axis of rotational symmetry of the respective optical elements. An optical axis may coincide with a mechanical axis, however, off-axis optical elements are also contemplated in which an optical axis differs from a mechanical axis. As used herein, the term "axial orientation" with reference to a beam refers to a vertical and/or horizontal position of the beam relative to an optical axis. As used herein, the term "angular orientation" with reference to a beam refers to an angle of the beam relative to an optical axis.

As described herein, the presently disclosed subject matter involves the use of additive manufacturing machines or systems. As used herein, the term "additive manufacturing" refers generally to manufacturing technology in which components are manufactured in a layer-by-layer manner. An exemplary additive manufacturing machine may be configured to utilize any desired additive manufacturing technology. The additive manufacturing machine may utilize an additive manufacturing technology that includes a powder bed fusion (PBF) technology, such as a direct metal laser melting (DMLM) technology, a selective laser melting (SLM) technology, a directed metal laser sintering (DMLS) technology, or a selective laser sintering (SLS) technology. In an exemplary PBF technology, thin layers of powder material are sequentially applied to a build plane and then selectively melted or fused to one another in a layer-by-layer manner to form one or more three-dimensional objects. Additively manufactured objects are generally monolithic in nature and may have a variety of integral sub-components.

Additionally or alternatively suitable additive manufacturing technologies include, for example, Fused Deposition Modeling (FDM) technology, Direct Energy Deposition (DED) technology, Laser Engineered Net Shaping (LENS) technology, Laser Net Shape Manufacturing (LNSM) technology, Direct Metal Deposition (DMD) technology, Digital Light Processing (DLP) technology, Vat Polymerization (VP) technology, Stereolithography (SLA) technology, and other additive manufacturing technology that utilizes an energy beam.

Additive manufacturing technology may generally be described as fabrication of objects by building objects point-by-point, layer-by-layer, typically in a vertical direction. Other methods of fabrication are contemplated and within the scope of the present disclosure. For example, although the discussion herein refers to the addition of material to form successive layers, the presently disclosed subject matter may be practiced with any additive manufacturing technology or other manufacturing technology, including layer-additive processes, layer-subtractive processes, or hybrid processes.

The additive manufacturing processes described herein may be used for forming components using any suitable powder material. For example, the powder material may be metal, ceramic, polymer, epoxy, photopolymer resin, plastic, concrete, or any other suitable material that may be in solid, liquid, powder, sheet material, wire, or any other suitable form. Each successive layer may be, for example, between about 10 μm and 200 μm, although the thickness may be determined based on any number of parameters and may be any suitable size.

As used herein, the term "build plane" refers to a plane defined by a surface upon which an energy beam impinges during an additive manufacturing process. Generally, the surface of a powder bed defines the build plane. During irradiation of a respective layer of the powder bed, a previously irradiated portion of the respective layer may define a portion of the build plane, and/or prior to distributing powder material across a build module, a build plate that supports the powder bed generally defines the build plane.

It is understood that terms "upstream" and "downstream" refer to the relative direction with respect to fluid flow in a fluid pathway. For example, "upstream" refers to the direction from which the fluid flows, and "downstream" refers to the direction to which the fluid flows. It is also understood that terms such as "top", "bottom", "outward", "inward", and the like are words of convenience and are not to be construed as limiting terms. As used herein, the terms "first", "second", and "third" may be used interchangeably to distinguish one component from another and are not intended to signify location or importance of the individual components. The terms "a" and "an" do not denote a limitation of quantity, but rather denote the presence of at least one of the referenced item.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The presently disclosed subject matter will now be described in further detail. FIG. 1 schematically depicts an exemplary additive manufacturing system 100. The additive manufacturing system 100 may include one or more additive manufacturing machines 102. The one or more additive manufacturing machines 102 may include a control system 104. The control system 104 may be included as part of the additive manufacturing machine 102 or the control system 104 may be associated with the additive manufacturing machine 102. The control system 104 may include componentry integrated as part of the additive manufacturing machine 102 and/or componentry that is provided separately from the additive manufacturing machine 102. Various componentry of the control system 104 may be communicatively coupled to various componentry of the additive manufacturing machine 102.

The control system 104 may be communicatively coupled with a management system 106 and/or a user interface 108. The management system 106 may be configured to interact with the control system 104 in connection with enterprise-level operations pertaining to the additive manufacturing system 100. Such enterprise level operations may include transmitting data from the management system 106 to the control system 104 and/or transmitting data from the control system 104 to the management system 106. The user interface 108 may include one or more user input/output devices to allow a user to interact with the additive manufacturing system 100.

As shown, an additive manufacturing machine 102 may include a build module 110 that includes a build chamber 112 within which an object or objects 114 may be additively manufactured. An additive manufacturing machine 102 may include a powder module 116 and/or an overflow module 118. The build module 110, the powder module 116, and/or the overflow module 118 may be provided in the form of modular containers configured to be installed into and removed from the additive manufacturing machine 102 such as in an assembly-line process. Additionally, or in the alternative, the build module 110, the powder module 116, and/or the overflow module 118 may define a fixed componentry of the additive manufacturing machine 102.

The powder module 116 contains a supply of powder material 120 housed within a supply chamber 122. The powder module 116 includes a powder piston 124 that elevates a powder floor 126 during operation of the additive manufacturing machine 102. As the powder floor 126 elevates, a portion of the powder material 120 is forced out of the powder module 116. A recoater 128 such as a blade or roller sequentially distributes thin layers of powder material 120 across a build plane 130 above the build module 110. A build platform 132 supports the sequential layers of powder material 120 distributed across the build plane 130. A build platform 132 may include a build plate (not shown) secured thereto and upon which an object 114 may be additively manufactured.

The additive manufacturing machine 102 includes an energy beam system 134 configured to generate one or more of energy beams such as laser beams and to direct the respective energy beams onto the build plane 130 to selectively solidify respective portions of the powder bed 138 defining the build plane 130. As the respective energy beams selectively melt or fuse the sequential layers of powder material 120 that define the powder bed 138, the object 114 begins to take shape. The one or more energy beams or laser beams may include electromagnetic radiation having any suitable wavelength or wavelength range, such as a wavelength or wavelength range corresponding to infrared light, visible light, and/or ultraviolet light.

Typically, with a DMLM, EBM, or SLM system, the powder material 120 is fully melted, with respective layers being melted or re-melted with respective passes of the energy beams. With DMLS or SLS systems, typically the layers of powder material 120 are sintered, fusing particles of powder material 120 to one another generally without reaching the melting point of the powder material 120. The energy beam system 134 may include componentry integrated as part of the additive manufacturing machine 102 and/or componentry that is provided separately from the additive manufacturing machine 102.

The energy beam system 134 may include one or more irradiation devices 142 configured to generate a plurality of energy beams 144 and to direct the energy beams 144 upon the build plane 130. The irradiation devices may respectively have an energy beam source, a galvo-scanner, and optical assembly 136 that includes a plurality of optical elements configured to direct the energy beam onto the build plane 130. The optical assembly 136 may include one or more optical elements, such as lenses through which an energy beam may be transmitted along an optical path from the energy beam source to the build plane. By way of example, an optical assembly 136 may include one more focusing lenses that focus an energy beam on a build plane 130. Additionally, or in the alternative, an optical assembly 136 may include a window, such as a protective glass, that separates one or more components of the energy beam system 134 from a process chamber 140 within which powder material is irradiated by one or more energy beams 144 to additively manufacture a three-dimensional object 114. The window or protective glass may include one or more optical elements, such as lenses or panes, through which an energy beam passes along an optical path to the build plane 130. The window or protective glass may separate the one or more components of the energy beam system from conditions existing within the process chamber 140 of an additive manufacturing machine 102. Such window or protective glass may prevent contaminants associated with the additive manufacturing process, such as powder material, dust, soot, residues from fumes or vapor, and the like, from coming into contact with sensitive components of an energy beam system 134. Accumulation of contaminants upon various optical elements of an optical assembly 136 may adversely affect operation of the energy beam system 134 and/or quality metrics associated with an energy beam system. Additionally, or in the alternative, such contaminants may cause damage to various optical elements of an optical assembly 136. The presently disclosed optical element monitoring systems may be configured to monitor various optical elements of an optical assembly 136 for accumulation of contaminants and/or damage. Additionally, or in the alternative, the presently disclosed optical element monitoring systems may be configured to initiate cleaning, maintenance, and/or replacement of various optical elements of an optical assembly 136.

As shown in FIG. 1, the energy beam system 134 includes a first irradiation device 142a and a second irradiation device 142b. The first irradiation device 142a may include a first optical assembly 136a, and/or the second irradiation device 142b may include a second optical assembly 136b. Additionally, or in the alternative, an energy beam system 134 may include three, four, six, eight, ten, or more irradiation devices, and such irradiation devices may respectively include an optical assembly 136. The plurality of irradiation devices 142 may be configured to respectively generate one or more energy beams that are respectively scannable within a scan field incident upon at least a portion of the build plane 130. For example, the first irradiation device 142a may generate a first energy beam 144a that is scannable within a first scan field 146a incident upon at least a first build plane region 148a. The second irradiation device 142b may generate a second energy beam 144b that is scannable within a second scan field 146b incident upon at least a second build plane region 148b. The first scan field 146a and the second scan field 146b may overlap such that the first build plane region 148a scannable by the first energy beam 144a overlaps with the second build plane region 148b scannable by the second energy beam 144b. The overlapping portion of the first build plane region 148a and the second build plane region 148b may sometimes be referred to as an interlace region 150. Portions of the powder bed 138 to be irradiated within the interlace region 150 may be irradiated by the first energy beam 144a and/or the second energy beam 144b in accordance with the present disclosure.

To irradiate a layer of the powder bed 138, the one or more irradiation devices (e.g., the first irradiation device 142a and the second irradiation device 142b) respectively direct the plurality of energy beams (e.g., the first energy beam 144a and the second energy beam 144b) across the respective portions of the build plane 130 (e.g., the first build plane region 148a and the second build plane region 148b) to melt or fuse the portions of the powder material 120 that are to become part of the object 114. The first layer or series of layers of the powder bed 138 are typically melted or fused to the build platform 132, and then sequential layers of the powder bed 138 are melted or fused to one another to additively manufacture the object 114. As sequential layers of the powder bed 138 are melted or fused to one another, a build piston 152 gradually lowers the build platform 132 to make room for the recoater 128 to distribute sequential layers of powder material 120. The distribution of powder material 120 across the build plane 130 to form the sequential layers of the powder bed 138, and/or the irradiation imparted to the powder bed 138, may introduce contaminants, such as powder material, dust, soot, residues from fumes or vapor, and the like, into the environment of the process chamber 140. Such contaminants may accumulate on various optical elements of the optical assembly 136 associated with the energy beam system 134.

As the build piston 152 gradually lowers and sequential layers of powder material 120 are applied across the build plane 130, the next sequential layer of powder material 120 defines the surface of the powder bed 138 coinciding with the build plane 130. Sequential layers of the powder bed 138 may be selectively melted or fused until a completed object 114 has been additively manufactured. An additive manufacturing machine may utilize an overflow module 118 to capture excess powder material 120 in an overflow chamber 154. The overflow module 118 may include an overflow piston 156 that gradually lowers to make room within the overflow chamber 154 for additional excess powder material 120.

It will be appreciated that an additive manufacturing machine may not utilize a powder module 116 and/or an overflow module 118, and that other systems may be provided for handling the powder material 120, including different powder supply systems and/or excess powder recapture systems. The subject matter of the present disclosure may be practiced with any suitable additive manufacturing machine without departing from the scope hereof.

Still referring to FIG. 1, an additive manufacturing machine 102 may include an imaging system 158 configured to monitor one or more operating parameters of an additive manufacturing machine 102, one or more parameters of an energy beam system 134, and/or one or more operating parameters of an additive manufacturing process. The imaging system may a calibration system configured to calibrate one or more operating parameters of an additive manufacturing machine 102 and/or of an additive manufacturing process. The imaging system 158 may be a melt pool monitoring system. The one or more operating parameters of the additive manufacturing process may include operating parameters associated with additively manufacturing a three-dimensional object 114. The imaging system 158 may be configured to detect an imaging beam such as an infrared beam from a laser diode and/or a reflected portion of an energy beam (e.g., a first energy beam 144a and/or a second energy beam 144b).

An energy beam system 134 and/or an imaging system 158 may include one or more detection devices. The one or more detection devices may be configured to determine one or more parameters of an energy beam system 134, such as one or more parameters associated with irradiating the sequential layers of the powder bed 138 based at least in part on an assessment beam detected by the imaging system 158. One or more parameters associated with irradiating the sequential layers of the powder bed 138 may include irradiation parameters and/or object parameters, such as melt pool monitoring parameters. The one or more parameters determined by the imaging system 158 may be utilized, for example, by the control system 104, to control one or more operations of the additive manufacturing machine 102 and/or of the additive manufacturing system 100. The one or more detection devices may be configured to obtain assessment data of the build plane 130 from a respective assessment beam. An exemplary detection device may include a camera, an image sensor, a photo diode assembly, or the like. For example, a detection device may include charge-coupled device (e.g., a CCD sensor), an active-pixel sensor (e.g., a CMOS sensor), a quanta image device (e.g., a QIS sensor), or the like. A detection device may additionally include a lens assembly configured to focus an assessment beam along a beam path to the detection device. An imaging system 158 may include one or more imaging optical elements (not shown), such as mirrors, beam splitters, lenses, and the like, configured to direct an assessment beam to a corresponding detection device.

In addition or in the alternative to determining parameters associated with irradiation the sequential layers of the powder bed 138, the imaging system 158 may be configured to perform one or more calibration operations associated with an additive manufacturing machine 102, such as a calibration operation associated with the energy beam system 134, one or more irradiation devices 142 or components thereof, and/or the imaging system 158 or components thereof. The imaging system 158 may be configured to project an assessment beam and to detect a portion of the assessment beam reflected from the build plane 130. The assessment beam may be projected by an irradiation device 142 and/or a separate beam source associated with the imaging system 158. Additionally, and/or in the alternative, the imaging system 158 may be configured to detect an assessment beam that includes radiation emitted from the build plane 130, such as radiation from an energy beam 144 reflected from the powder bed 138 and/or radiation emitted from a melt pool in the powder bed 138 generated by an energy beam 144 and/or radiation emitted from a portion of the powder bed 138 adjacent to the melt pool. The imaging system 158 may include componentry integrated as part of the additive manufacturing machine 102 and/or componentry that is provided separately from the additive manufacturing machine 102. For example, the imaging system 158 may include componentry integrated as part of the energy beam system 134. Additionally, or in the alternative, the imaging system 158 may include separate componentry, such as in the form of an assembly, that can be installed as part of the energy beam system 134 and/or as part of the additive manufacturing machine 102.

Now referring to FIGS. 2A-2D, exemplary irradiation devices 142 will be further described. An additive manufacturing system 100 and/or an additive manufacturing machine 102 may include one or more irradiation devices 142 configured as described with reference to FIGS. 2A-2D. In exemplary embodiments, an irradiation device 142 may include on or more optical elements configured to operate upon an energy beam 144. The optical elements may include lenses, mirrors, collimators, dichroic elements, diffractive elements, refractive elements, polarizers, phase shifters, frequency shifters, beam shaping elements, aperture elements, and so forth. The one or more optical elements may be integrated into the irradiation device 142 and/or may be provided as separate components. Respective optical elements may be selected to provide a suitable energy beam 144 for the particular use of the irradiation device 142, such as for the type of additive manufacturing to be performed using the irradiation device 142 and/or the type of powder material 120 to be utilized to additively manufacture three-dimensional objects 114.

As shown in FIGS. 2A-2D, an irradiation device 142 may include a beam source 200, and one or more beam positioning elements 202 disposed downstream from the beam source 200. As examples, the beam source 200 may include a laser fiber or a laser fiber array, or a laser diode or a laser diode array; however, other types of beam sources 200 are also contemplated and the examples given are not to be limiting. A beam splitter 204 may be positioned downstream from the one or more beam positioning elements 202. The beam splitter 204 may be configured to extract or split a measurement beam 206 from the energy beam 144. The measurement beam 206 may propagate along a measurement path 210 to the one or more beam sensors 208, while the energy beam 144 may propagate along an irradiation path 212 to the powder material 120. The one or more beam sensors 208 may be configured to determine one or more parameters of the measurement beam 206. The one or more parameters of the measurement beam 206 may be utilized to align the energy beam 144 with an optical axis of the irradiation device 142.

An exemplary an irradiation device 142 may be configured to emit an energy beam 144 that has a manufacturing power level selected to additively manufacturing a three-dimensional object 114 by irradiating a powder material 120. Additionally, or in the alternative, the irradiation device 142 may be configured to emit an energy beam 144 that has a calibration power level. The manufacturing power level may exceed the calibration power level by at least one order of magnitude. By way of example, the manufacturing power level may be from about 100 watts (W) to about 3,000 W, such as from about 500 W to about 1,500 W. By way of example, the calibration power level may be from about 1 W to about 100 W, such as from about 10 W to about 50 W.

The beam splitter 204 may include a dichroic element, such as a dichroic mirror, a dichroic filter, or the like. The beam splitter 204 may provide a measurement beam 206 that has a relatively low power level and/or intensity, for example, that is suitable for use with the one or more beam sensors 208. In some embodiments, a beam splitter may provide a measurement beam 206 with a suitable power level and/or intensity for performing a calibrating alignment with the energy beam 144 operating at a reduced power level. Additionally, or in the alternative, the measurement beam 206 may exhibit a suitable power level and/or intensity for performing a manufacturing alignment with the energy beam 144 operating at a nominal power level for additively manufacturing a three-dimensional object 114. The beam splitter 204 may be configured with relatively high reflectance, such that the energy beam 144 is reflected and the measurement beam 206 is transmitted by the beam splitter 204.

A transmission ratio may be determined for a beam splitter 204 as a ratio of the intensity of a transmitted beam to the intensity of a reflected beam (% T/% R). A transition ratio of a beam splitter 204 with a relatively low transmittance, as determined by a ratio of the intensity of the transmitted beam to the intensity of the reflected beam (% T/% R) may be from 15% to about 0.1%, such as from about 10% to about 0.5%, or such as from about 5% to about 1%. Alternatively, the beam splitter 204 may be configured with a relatively high transmittance, such that the measurement beam 206 is reflected by the beam splitter 204 and the energy beam 144 is transmitted by the beam splitter 204. The transmission ratio of a beam splitter 204 with a relatively high transmittance may be from about 15% to about 0.1% of the intensity of the energy beam 144, such as from about 10% to about 0.5%, or such as from about 5% to about 1% of the intensity of the energy beam 144.

The one or more beam sensors 208 may include one or more photodiodes, configured, for example, as a quadrant sensor, a lateral displacement sensor, a charge-coupled device (e.g., a CCD sensor), an active-pixel sensor (e.g., a CMOS sensor), a quanta image device (e.g., a QIS sensor), or the like. An exemplary quadrant sensor may be configured to determine a position of a measurement beam 206 based at least in part on an intensity value determined from respective ones of four photosensors corresponding to respective quadrants. A photosensor with a relatively higher intensity value may indicate that the measurement beam 206 is oriented towards the quadrant corresponding to such photosensor, and/or a photosensor with a relatively lower intensity value may indicate that the measurement beam 206 is oriented towards the quadrant corresponding to such photosensor. A lateral displacement sensor may include an array of photosensitive pixels. A lateral displacement sensor may determine an orientation of a measurement beam 206 based at least in part on lateral displacement. The lateral displacement may be determined based at least in part on which pixels from the array are activated by the measurement beam 206. Exemplary beam sensors may be configured to detect a measurement beam 206 with a power of from about 1 microwatt ($\mu$W) to about 100 milliwatt (mW), such as from about 1 $\mu$W to about 1,000 $\mu$W, or such as from about 10 $\mu$W to about 100 $\mu$K. The beam splitter 204 may be configured to provide a measurement beam 206 with a power level and/or intensity suitable for use with the one or more beam sensors 208.

Still referring to FIGS. 2A-2D, an irradiation device 142 may include a beam collimator 214. The beam collimator 214 may include one or more optical elements configured to collimate the energy beam 144. The beam collimator 214 may be operably coupled to the beam source 200. Additionally, or in the alternative, the beam collimator 214 may be positioned downstream from the beam source 200. In some embodiments, the beam collimator 214 may be located upstream from the one or more beam positioning elements 202. The beam collimator 214 may include one or more lenses configured to collimate and/or otherwise condition the energy beam 144 for irradiating the powder bed 138 to additively manufacture a three-dimensional object 114. For example, the beam collimator 214 may be configured to collimate the energy beam 144 prior to becoming incident upon the one or more beam positioning elements 202

An irradiation device 142 may additionally include a focusing lens assembly 216. The focusing lens assembly 216 may be located downstream from the one or more beam positioning elements 202. The focusing lens assembly 216 may include one or more lenses configured to focus and/or otherwise condition the energy beam 144, such as after having been collimated by the beam collimator 214, for irradiating the powder bed 138 to additively manufacture a three-dimensional object 114. The focusing lens assembly 216 may include a flat-field lens assembly, such as a telecentric lens assembly. The flat-field lens assembly may be configured as a Fourier lens assembly, an f-theta lens assembly, an f-tan-theta lens assembly, or the like.

In some embodiments, the energy beam 144 may propagate from the focusing lens assembly 216 directly to the build plane 130. Additionally, or in the alternative, one or more mirrors may be disposed along the irradiation path 212 between the focusing lens assembly 216 and the build plane 130. For example, the irradiation device 142 may include a scanner 218, such as a galvo-scanner or the like, configured to cause the energy beam 144 to follow a scan path that propagates across the build plane 130 to irradiate specified portions of the powder bed 138, thereby forming an additively manufactured three-dimensional object 114.

The irradiation device 142 may include a window 220, such as a protective glass, that separates one or more components of the irradiation device 142 from a process chamber 140 within which powder material is irradiated by the energy beam 144 to additively manufacture a three-dimensional object 114. The window 220 may include one or more optical elements, such as lenses or panes, through which an energy beam 144 passes along the irradiation path 212 to the build plane 130. The window or protective glass may separate the components of the irradiation device 142 from conditions existing within the process chamber 140. For example, the window 220 may prevent contaminants associated with the additive manufacturing process, such as powder material, dust, soot, residues from fumes or vapor, and the like, from coming into contact with sensitive components of the irradiation device 142.

The one or more beam positioning elements 202 may be configured to align the energy beam 144 with an optical axis of the irradiation device 142. An axial orientation of the energy beam 144 and/or an angular orientation of the energy beam 144 may be at least partially aligned with an optical axis of the irradiation device 142 at least in part by adjusting a position of the one or more beam positioning elements 202. In some embodiments, the one or more beam positioning elements 202 may at least partially align the energy beam 144 with an optical axis of the focusing lens assembly 216, which may sometimes be referred to as a focusing lens-optical axis ($A_F$) 222. Additionally, or in the alternative, the one or more beam positioning elements 202 may at least partially align the energy beam 144 with an optical axis of the beam collimator 214, which may sometimes be referred to as a collimator-optical axis ($A_C$) 224.

The one or more beam positioning elements 202 may be configured to adjust a position and/or orientation of the energy beam 144 based at least in part on position information determined with the one or more beam sensors 208. A beam positioning elements 202 may include an optical element 226, an optical element mount 228 configured to hold the optical element 226, an adjustment bracket 230, and one or more actuators 232 configured to move the optical element mount 228 relative to the adjustment bracket 230. The one or more actuators 232 may be controlled by a control system 104 based at least in part on position information from the one or more beam sensors 208. In some embodiments, the beam positioning element may be configured as a kinematic optical element as described with reference to FIGS. 5A-5D. Adjustments to the one or more beam positioning elements 202 may bring the energy beam 144 at least partially into alignment with an optical axis of the irradiation device 142, such as a focusing lens-optical axis ($A_F$) 222 and/or a collimator-optical axis ($A_C$) 224.

Additionally, or in the alternative, adjustments to the one or more beam positioning elements 202 may maintain the energy beam 144 at least partially in alignment with such an optical axis of the irradiation device 142, such as over a period of time when additively manufacturing a three-dimensional object 114.

In some embodiments, an irradiation device 142 may include a beam collimator 214 configured to adjust a position and/or orientation of the energy beam 144, based at least in part on position information determined with the one or more beam sensors 208. The beam collimator 214 may include a collimator positioning element 234 configured to adjust a position of the beam collimator 214. The position of the beam collimator 214 may be adjusted, such as by adjusting the collimator positioning element 234, based at least in part on position information from the one or more beam sensors 208. The energy beam 144 may be at least partially aligned with an optical axis of the irradiation device 142 at least in part by adjusting the collimator positioning element 234.

The collimator positioning element 234 may be configured as, or may include, a beam positioning element 202, including with an optical element 226, an optical element mount 228 configured to hold the optical element 226, an adjustment bracket 230, and one or more actuators 232 configured to move the optical element mount 228 relative to the adjustment bracket 230. The one or more actuators 232 may be controlled by a control system 104 based at least in part on position information from the one or more beam sensors 208. Adjustments to the collimator positioning element 234 may bring the energy beam 144 at least partially into alignment with an optical axis of the irradiation device 142, such as a focusing lens-optical axis ($A_F$) 222 and/or a collimator-optical axis ($A_C$) 224. Additionally, or in the alternative, adjustments to the collimator positioning element 234 may maintain the energy beam 144 at least partially in alignment with such an optical axis of the irradiation device 142, such as over a period of time when additively manufacturing a three-dimensional object 114.

Figure 2A:
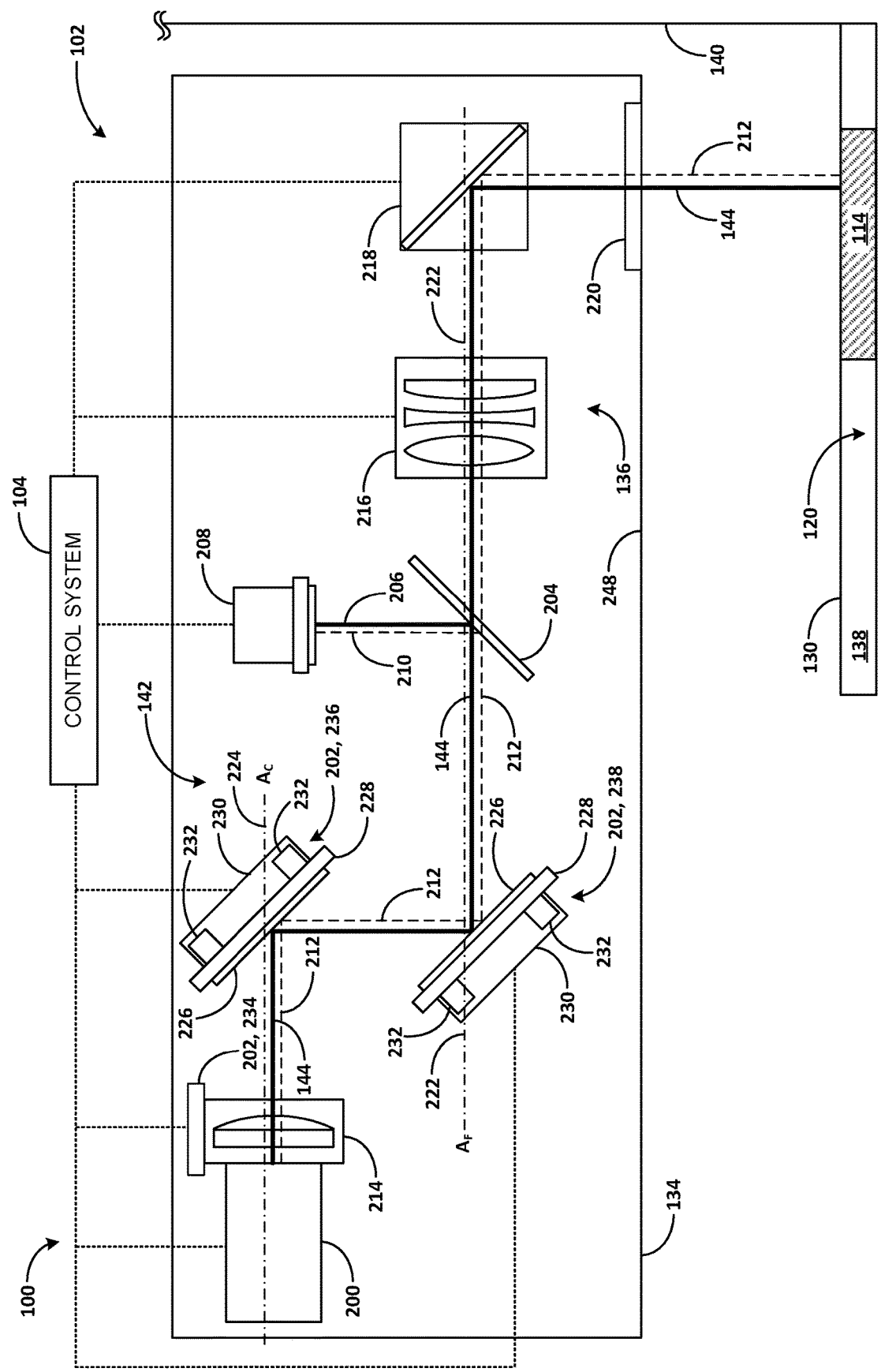
FIGS. 2A-2D schematically depict exemplary irradiation devices that include a beam alignment system.
Figure 2B:
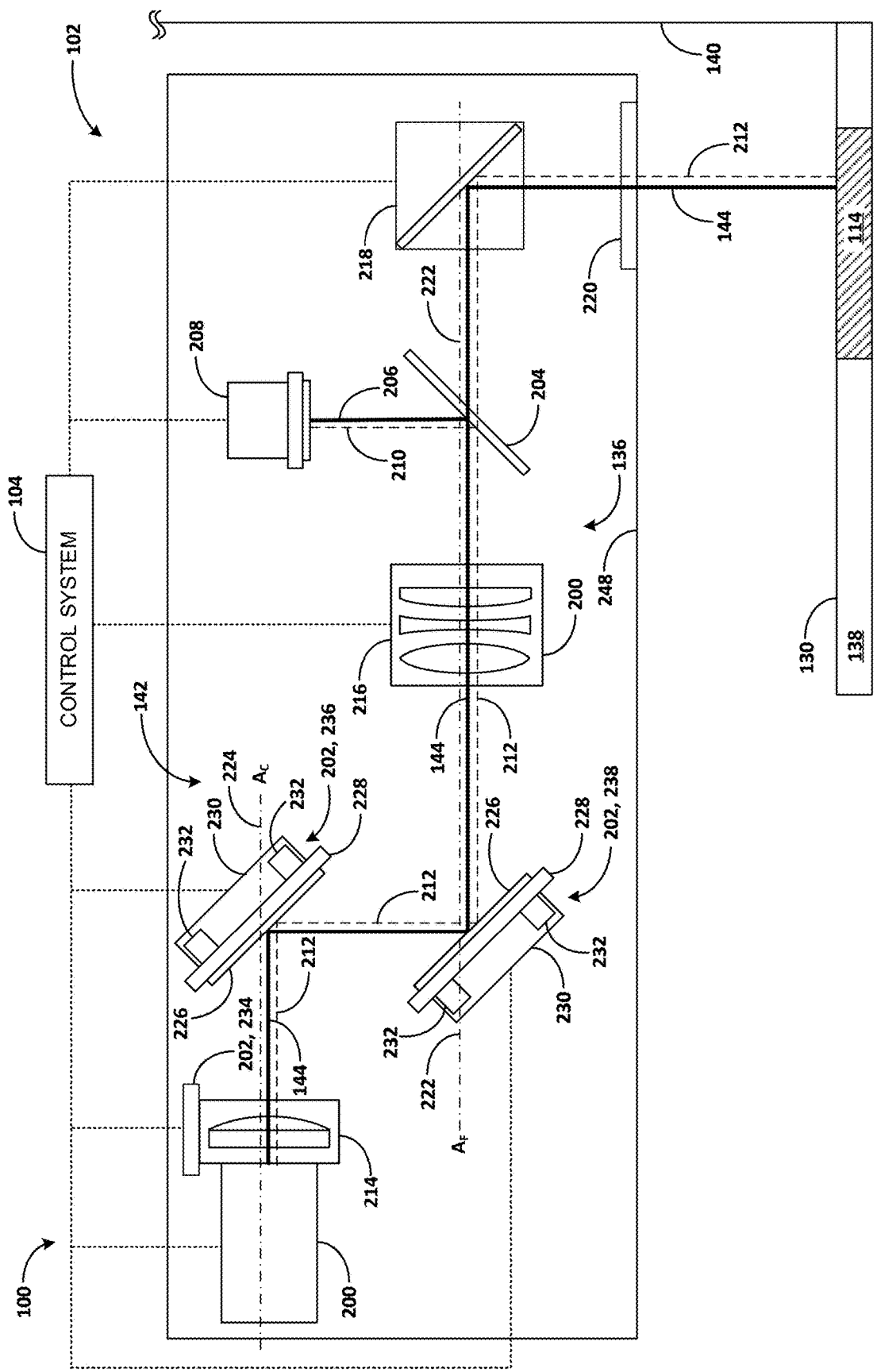

As shown in FIGS. 2A and 2B, an irradiation device 142 may include a first beam positioning element 236 and a second beam positioning element 238. The first beam positioning element 236 and the second beam positioning element 238 may be positioned upstream from a focusing lens assembly 216. The first beam positioning element 236 and the second beam positioning element 238 may be configured to work in concert to align the energy beam 144 with an optical axis of the irradiation device 142, such as with the focusing lens-optical axis ($A_F$) 222. In some embodiments, the first beam positioning element 236 may be configured to adjust an axial orientation of the energy beam 144. Additionally, or in the alternative, the second beam positioning element 238 may be configured to adjust an angular orientation of the energy beam 144.

As shown in FIG. 2A, a measurement beam 206 may be extracted or split from the energy beam 144 by a beam splitter 204 located upstream from the focusing lens assembly 216. Additionally, or in the alternative, as shown in FIG. 2B, a measurement beam 206 may be extracted or split from the energy beam 144 by a beam splitter 204 located downstream from the focusing lens assembly 216. Regardless of whether the measurement beam 206 is obtained upstream or downstream from the focusing lens assembly, the measurement beam 206 may be directed to one or more beam sensors 208 may be configured to determine one or more parameters of the measurement beam 206.

The beam sensor 208 may be configured to provide position information from the measurement beam 206 corresponding to an axial orientation and/or an angular orientation of the energy beam 144. Position information corresponding to an axial orientation and/or an angular orientation of the energy beam 144 may be utilized to at least partially align the energy beam 144 with an optical axis of the irradiation device 142. For example, one or more beam positioning elements 202, such as the first beam positioning element 236, may be configured to at least partially align the energy beam 144 with respect to an axial orientation of the energy beam 144, based at least in part on the position information from the beam sensor 208. Additionally, or in the alternative, the one or more beam positioning elements 202, such as the second beam positioning element 238, may be configured to at least partially align the energy beam 144 with respect to an angular orientation of the energy beam 144, based at least in part on the position information from the beam sensor 208.

Figure 2C:
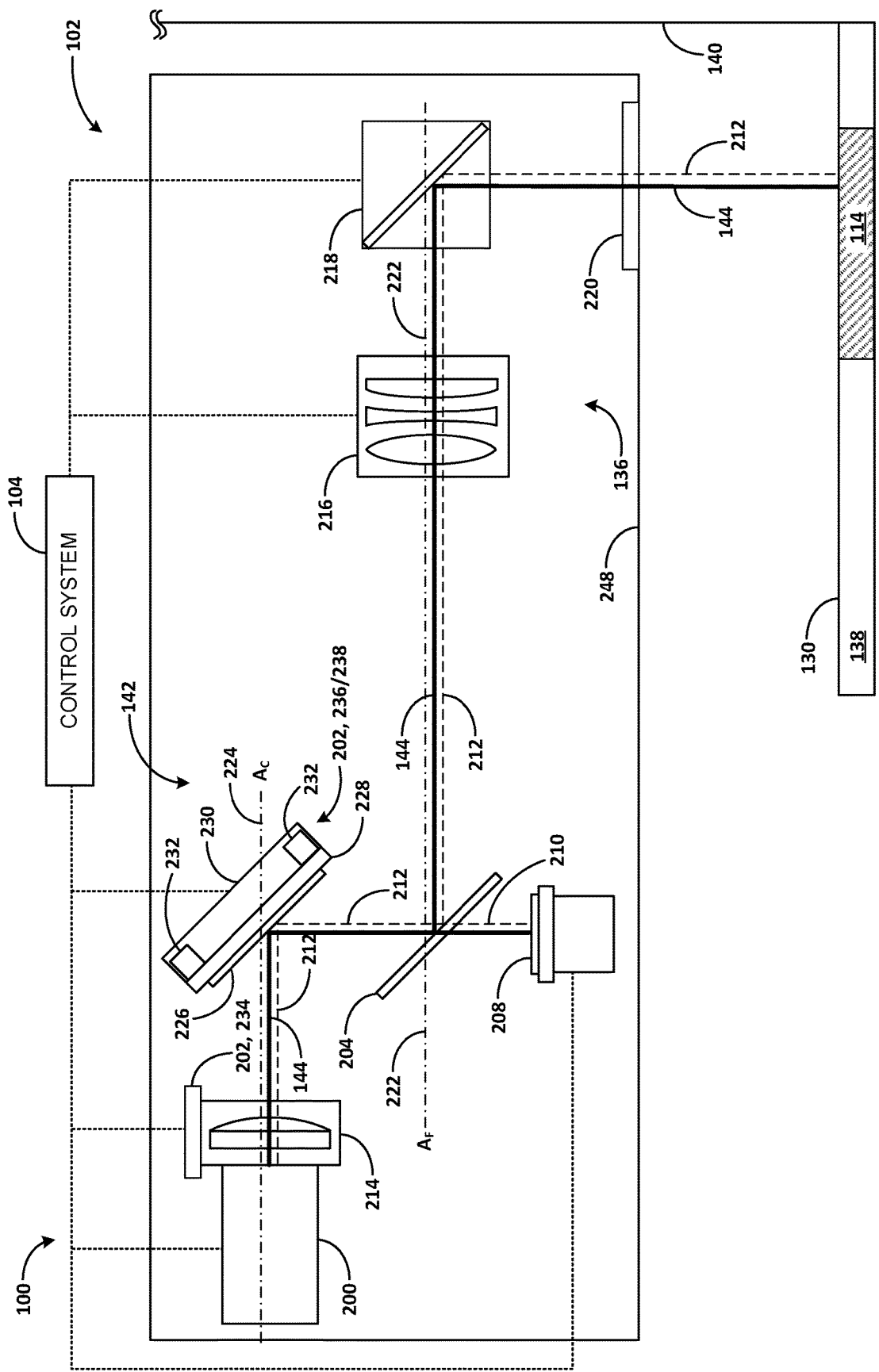
Figure 2D:
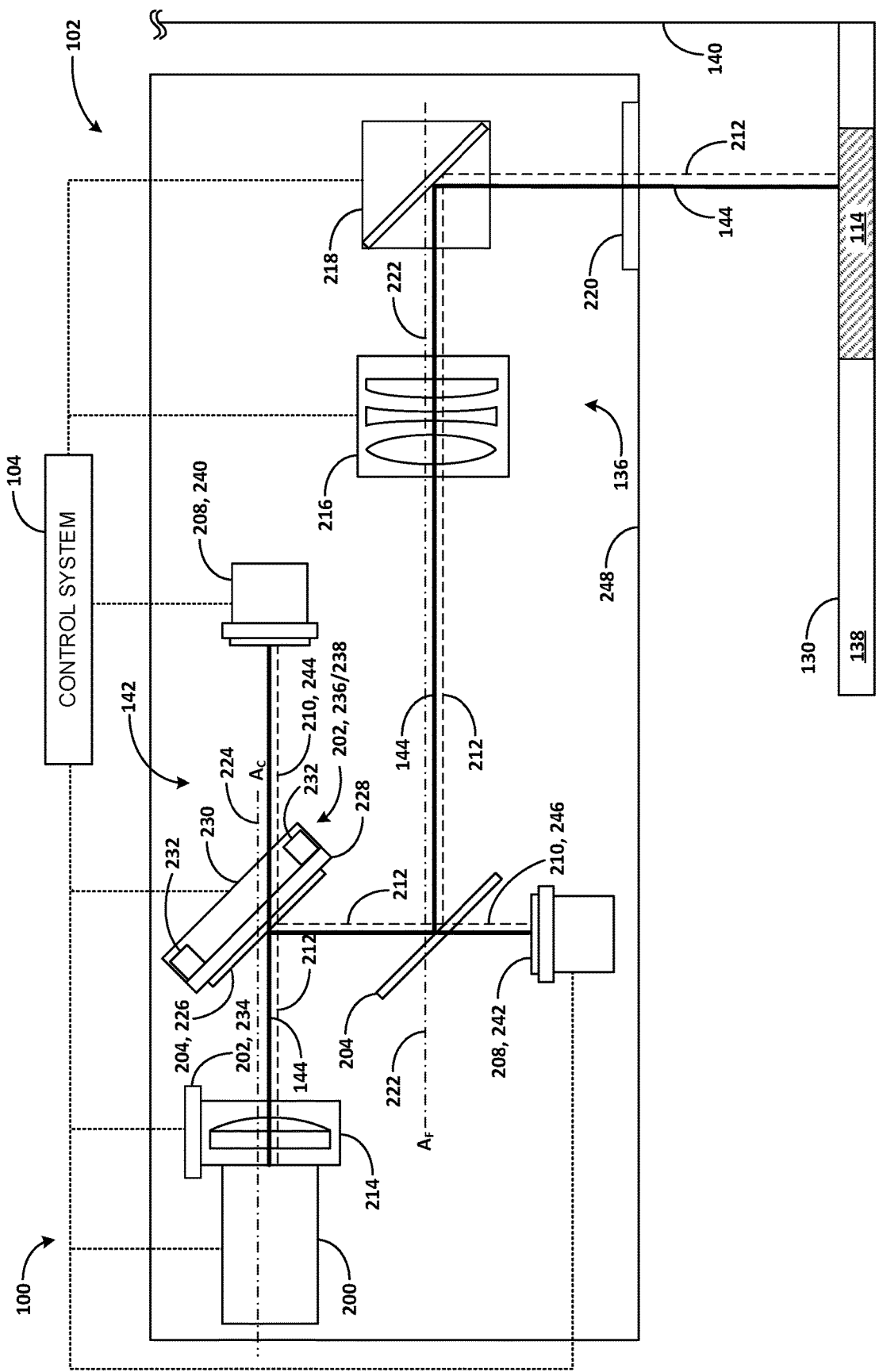

As shown in FIGS. 2C and 2D, an irradiation device 142 may include a single beam positioning element 202, such as a first beam positioning element 236. The first beam positioning element 236 may be positioned upstream from a focusing lens assembly 216. The first beam positioning element 236 may be configured to align the energy beam 144 with an optical axis of the irradiation device 142, such as with the focusing lens-optical axis ($A_F$) 222. In some embodiments, the first beam positioning element 236 may be configured to adjust an axial orientation of the energy beam 144 and/or an angular orientation of the energy beam 144. As shown in FIG. 2C, a measurement beam 206 may be extracted or split from the energy beam 144 by a beam splitter 204 located upstream from the focusing lens assembly 216. Additionally, or in the alternative, a measurement beam 206 may be extracted or split from the energy beam 144 by a beam splitter 204 located downstream from the focusing lens assembly 216, as shown in FIG. 2B. The measurement beam 206 may be directed to one or more beam sensors 208 configured to determine one or more parameters of the measurement beam 206.

As shown, for example, in FIG. 2D, an irradiation device 142 may include a first beam sensor 240 and a second beam sensor 242. The first beam sensor 240 may be configured to provide position information corresponding to an axial orientation of the energy beam 144. Additionally, or in the alternative, the second beam sensor 242 may be configured to provide position information corresponding to an angular orientation of the energy beam 144. In some embodiments, as shown, for example, in FIG. 2D, a beam positioning element 202 may include a beam splitter 204. For example, the optical element 226 mounted to the optical element mount 228 of the beam positioning element 202 may be configured as a beam splitter 204. As shown, a first beam sensor 240 may be configured to receive a first measurement beam 244 propagating from the optical element 226 of the beam positioning element 202, such as from a first beam splitter 204 mounted in the optical element mount 228 of the beam positioning element 202. Additionally, or in the alternative, a second beam sensor 242 may be configured to receive a second measurement beam 246 propagating from a second beam splitter 204 disposed downstream from the beam positioning element 202.

Position information corresponding to an axial orientation of the energy beam 144, such as from the first beam sensor 240, may be utilized to at least partially align the energy beam 144 with an optical axis of the irradiation device 142. For example, one or more beam positioning elements 202, such as the first beam positioning element 236, may be configured to at least partially align the energy beam 144 with an optical axis of the irradiation device 142, such as with respect to an axial orientation of the energy beam 144, based at least in part on the position information from the first beam sensor 240. Additionally, or in the alternative, position information corresponding to an angular orientation of the energy beam 144, such as from the second beam sensor 242, may be utilized to at least partially align the energy beam 144 with an optical axis of the irradiation device 142. For example, one or more beam positioning elements 202, such as the first beam positioning element 236, may be configured to at least partially align the energy beam 144 with an optical axis of the irradiation device 142, such as with respect to an angular orientation of the energy beam 144, based at least in part on the position information from the second beam sensor 242.

As further shown in FIGS. 2A-2D, in some embodiments, an irradiation device 142 may include a beam collimator 214 with a collimator positioning element 234, for example, in addition or in the alternative to the one or more beam positioning elements 202. The collimator positioning element 234, when included, may operate in concert with, or as an alternative to, a first beam positioning element 236 and/or a second beam positioning element 238 to at least partially align an energy beam 144 with an optical axis of the irradiation device 142. For example, a collimator positioning element 234, may be configured to at least partially align the energy beam 144 with respect to an axial orientation of the energy beam 144 and/or a beam positioning element 202 may be configured to at least partially align the energy beam 144 with respect to an angular orientation of the energy beam 144, based at least in part on the position information from the beam sensor 208.

In some embodiments, the irradiation device 142 may include a structural frame element 248, and the adjustment bracket 230 may be coupled directly or indirectly to the frame element 248. By coupling the adjustment bracket 230 to the frame element 248, vibrations that may otherwise translate to the beam positioning element may be minimized. In some embodiments, one or more additional optical elements of the irradiation device 142 may be coupled to the frame element 248. For example, the beam source 200, the one or more beam positioning elements 202, the beam splitters 204, the one or more beam sensors 208, the beam collimator 214, the focusing lens assembly 216, and/or the scanner 218 may be directly or indirectly coupled to the frame element 248.

Referring now to FIGS. 3A-3D, exemplary beam positioning elements 202 are further described. As shown, a beam position element 202 may include an optical element 226, such as a lens, a mirror, or the like. In some embodiments, the optical element 226 may include a beam splitter, such as a dichroic element. The optical element 226 may be mounted to, or in, or otherwise supported by, an optical element mount 228. The optical element mount 228 may be coupled to an adjustment bracket 230 at least in part by one or more actuators 232 configured to move the optical element mount 228 relative to the adjustment bracket 230.

In some embodiments, the beam positioning element may be configured as a kinematic optical element. As used herein, the term "kinematic optical element" refers to an optical element, such as a beam positioning element 202 and/or a collimator positioning element 234, that includes one or more kinematic couplings. As used herein, the term "kinematic coupling" refers to a coupling for which the number of independent constraint points equals the number of degrees of freedom constrained. For example, there are six (6) potential degrees of freedom in a mechanical system, and a kinematic coupling may include a total of six (6) independent constraint points. A kinematic coupling may operate according to principles of kinematic determinacy at least to a first-order approximation. An exemplary kinematic coupling may include three (3) kinematic constraints respectively configured as a tetrahedral constraint (3 independent constraint points), a v-groove constraint (2 independent constraint points), and a flat constraint (1 independent constraint), such as a Kelvin coupling, or the like. Another exemplary kinematic coupling may include three (3) kinematic constraints configured as a radial v-grooves (2 independent constrain points) that respectively mate with three radial hemispheres, such as a Maxwell coupling, or the like.

Figure 3A:
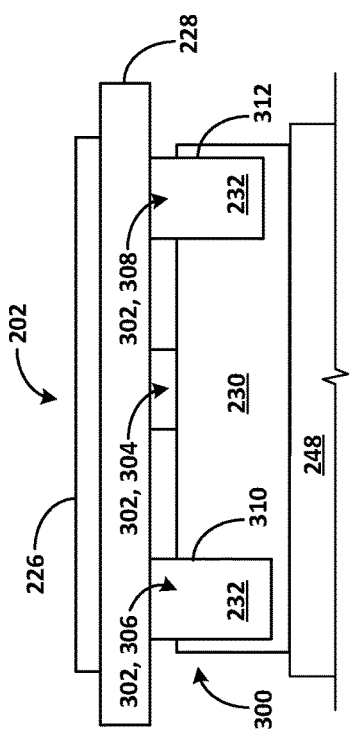
FIGS. 3A-3D schematically depict exemplary beam positioning optical elements.
Figure 3B:
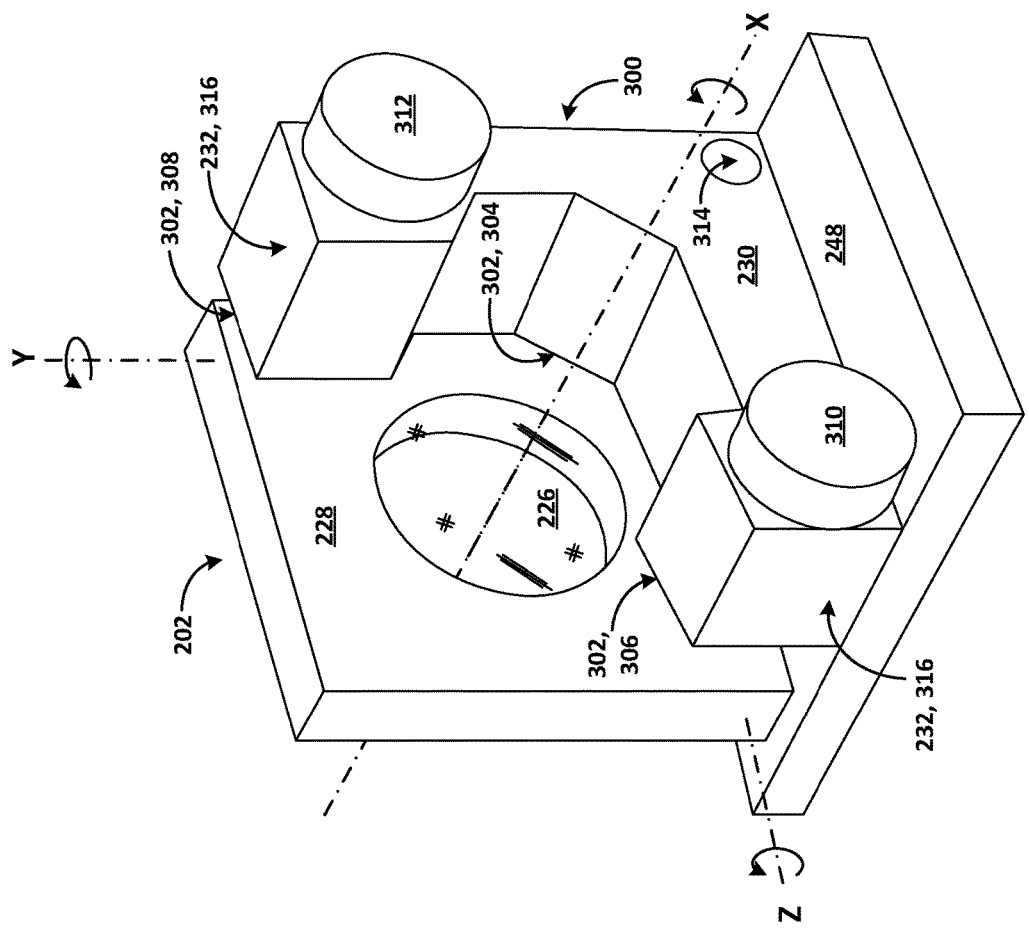

As shown, for example, in FIGS. 3A and 3B, an exemplary beam positioning element 202 may include one or more kinematic couplings 300. The one or more kinematic couplings 300 may include a plurality of kinematic constraints 302. For example, a beam positioning element 202 may include a kinematic coupling 300 with a first kinematic constraint 304, a second kinematic constraint 306, and a third kinematic constraint 308. The first kinematic constraint 304 may be configured as a tetrahedral constraint. The second kinematic constraint 306 may be configured as a v-groove constraint. The third kinematic constraint 308 may be configured as a flat constraint. The first kinematic constraint 304, the second kinematic constraint 306, and the third kinematic constraint 308 may together provide a kinematic coupling configured as a Kelvin coupling. Alternatively, the first kinematic constraint 304, the second kinematic constraint 306, and the third kinematic constraint 308 may be respectively configured as radial v-groove constraints that respectively mate with a radial hemisphere. The plurality of kinematic constraints 302 may together provide a kinematic coupling 300 configured as a Maxwell coupling. In some embodiments, the kinematic coupling 300 may be coupled to a frame element 248 of the irradiation device 142 with zero (0) degrees of freedom. As shown in FIG. 3A, the kinematic coupling 300 may be coupled to the frame element 248 in a configuration or arrangement such that the respective kinematic constraints 302 are adjacent to the frame element 248. As shown in FIG. 3B, the kinematic coupling 300 may be coupled to the frame element 248 in a configuration or arrangement such that the kinematic constraint 302 with the highest number of independent constraints is located adjacent to the frame element 248.

Referring back to FIGS. 2A-2D, in some embodiments, a first beam positioning element 236 may be configured to adjust an axial orientation of the energy beam 144, and the first beam positioning element 236 may include a kinematic coupling 300 that is adjustable with respect to one or more linear degrees of freedom and constrained with respect to one or more rotational degrees of freedom. For example, the first beam positioning element 236 may be constrained with respect to three (3) rotational degrees of freedom (pitch, roll, and yaw rotation), and/or the first beam positioning element 236 may be adjustable with respect to three (3) linear degrees of freedom (x, y, and z axis). Additionally, or in the alternative, a second beam positioning element 238 may be configured to adjust an angular orientation of the energy beam 144, and the second beam positioning element 238 may include a kinematic coupling 300 that is adjustable with respect to one or more rotational degrees of freedom and constrained with respect to one or more linear degrees of freedom. For example, the second beam positioning element 238 may be constrained with respect to three (3) linear degrees of freedom (x, y, and z axis), and/or the second beam positioning element 238 may be adjustable with respect to three (3) rotational degrees of freedom (pitch, roll, and yaw rotation).

In some embodiments, a collimator positioning element 234 may include a kinematic coupling 300. The collimator positioning element 234 may be adjustable with respect to one or more linear degrees of freedom and constrained with respect to one or more rotational degrees of freedom. For example, the collimator positioning element 234 may be constrained with respect to three (3) rotational degrees of freedom (pitch, roll, and yaw rotation), and/or the collimator positioning element 234 may be adjustable with respect to three (3) linear degrees of freedom (x, y, and z axis). Additionally, or in the alternative, a beam positioning element 202 disposed downstream from the collimator positioning element 234 may be configured to adjust an angular orientation of the energy beam 144, and the beam positioning element 202 may include a kinematic coupling 300 that is adjustable with respect to one or more rotational degrees of freedom and constrained with respect to one or more linear degrees of freedom. For example, a beam positioning element 202 downstream from a collimator positioning element 234 may be constrained with respect to three (3) linear degrees of freedom (x, y, and z axis), and/or the beam positioning element 202 may be adjustable with respect to three (3) rotational degrees of freedom (pitch, roll, and yaw rotation).

Referring again to FIGS. 3A-3D, in some embodiments, a beam positioning element 202, such as a beam positioning element that includes a kinematic coupling 300, may include one or more actuators 232 configured to move an optical element mount 228 relative to an adjustment bracket 230. The beam positioning element 202 may include a first actuator 310 and a second actuator 312. The first actuator 310 may be associated with one or more kinematic constraints 302, such as a second kinematic constraint 306. The second actuator 312 may be associated with one or more kinematic constraints 302, such as a third kinematic constraint 308. In some embodiments, a beam positioning element 202 may include a third actuator 314, such as a third actuator 314 associated with a first kinematic constraint 304.

Figure 3C:
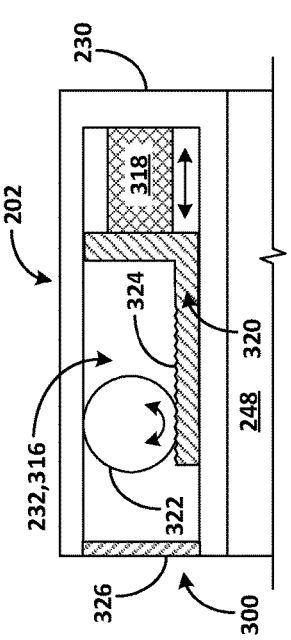
Figure 3D:
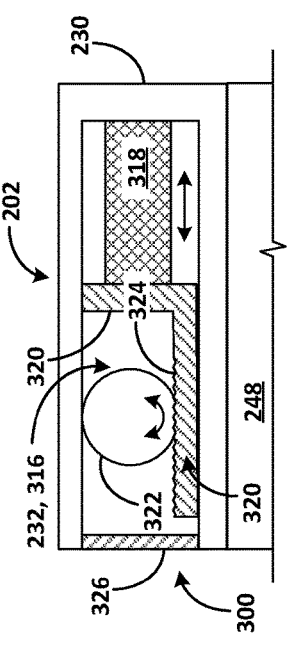

The one or more actuators 232 may be actuated by any desired motive force, including electric, hydraulic, pneumatic, and/or mechanical motive force. Additionally, or in the alternative, the one or more actuators 232 may be actuated manually, such as by an operator or a technician that applies a mechanical motive force, such as using a tool. As shown in FIGS. 3C and 3D, in some embodiments, a beam positioning element 202 may include one or more piezoelectric actuators 316 configured to adjust a position of an optical element mount 228. As used herein, the term "piezoelectric actuator" refers to an actuator 232 configured to be actuated at least in part by one or more piezoelectric elements.

A beam positioning element 202 may include one or more piezoelectric actuators 316 configured to move an optical element mount 228 relative to an adjustment bracket 230. By way of example, a beam positioning element 202 that includes a piezoelectric actuator 316 may include one or more piezoelectric elements 318 configured to exert a piezoelectric motive force, and one or more gripping elements 320 configured to move an actuating element 322 responsive to the motive force from the piezoelectric elements 318. The actuating element 322 may be a fine-thread screw. The one or more gripping elements 320 may be configured to rotate the actuating element, such as a fine-thread screw. The piezoelectric actuator 316 may provide a step length from the one or more piezoelectric elements 318 that corresponds to a rotation of the actuating element 322 of from about 0.1 microradians (μrad) to about 100 μrad, such as from about 0.1 μrad to about 10 μrad, or such as from about 0.1 μrad to about 1 μrad. The rotation of the actuating element 322 may provide a linear displacement of the actuating element 322 of from about 1 nanometer (nm) per step to about 1,000 nm per step, such as from about 10 nm per step to about 500 nm per step. The one or more gripping elements 320 may include teeth 324 that mate with or otherwise grip a surface of the actuating element 322. The piezoelectric actuator 316 may include a preload element 326, such as a spring or the like, configured to apply a force that holds the one or more gripping elements 320 in contact with the actuating element 322. In some embodiments, the piezoelectric actuator 316 may be configured as an inertia drive. Additionally, or in the alternative, the piezoelectric actuator 316 may be self-locking when at rest. The piezoelectric actuator may provide a holding force of from about 10 newtons (N) to about 150 N, such as from about 25 N to about 100 N.

Referring now to FIGS. 4A-4D and FIGS. 5A-5E, an exemplary beam sensor 208 are further described. An exemplary beam sensor 208 may include one or more sensor elements 400. A respective sensor element 400 may include a photoreceptor set 402 that includes one or more photoreceptors, such as photodiodes, phototransistors, or other photoconductive elements. The photoreceptor set 402 may be configured as a single photoreceptor, or as a plurality of photoreceptors, such as a two-dimensional array of photoreceptors. By way of example, a sensor element 400 may include a photoreceptor set 402 configured as a sensor detector, a lateral displacement sensor, a charge-coupled device (e.g., a CCD sensor), an active-pixel sensor (e.g., a CMOS sensor), a quanta image device (e.g., a QIS sensor), or the like. Additionally, or in the alternative, a photoreceptor set 402 may be configured as an optical integrated circuit that includes one or more photodiodes and an electronic signal-processing circuitry.

Figure 4A:
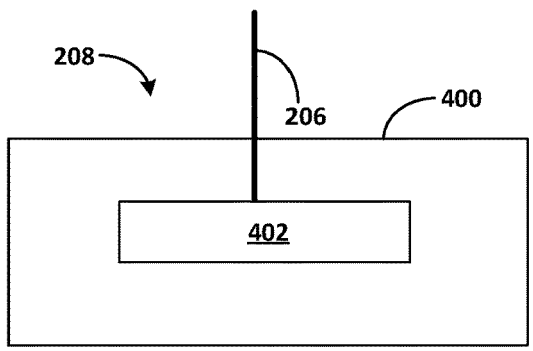
FIGS. 4A-4D schematically depict exemplary beam sensors that may be included in an irradiation device, such as an irradiation device that includes a beam alignment system.
Figure 4B:
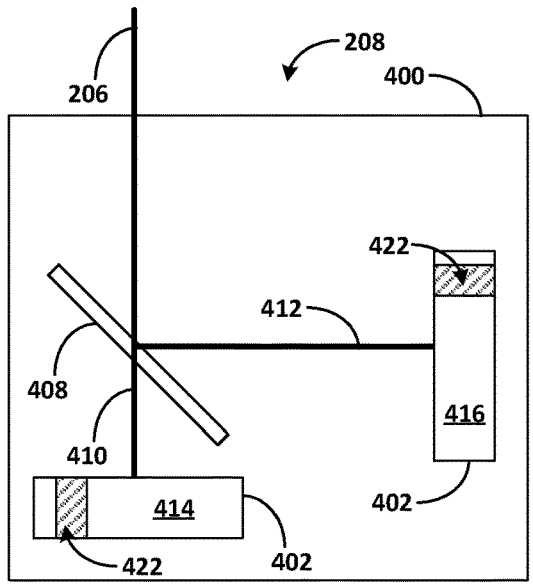
Figure 4C:
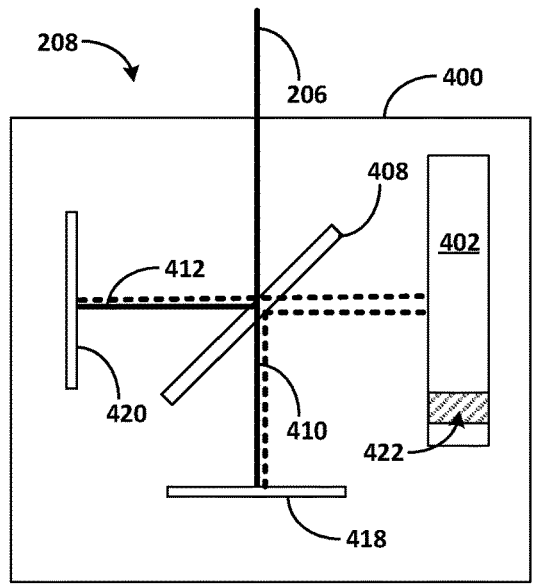
Figure 4D:
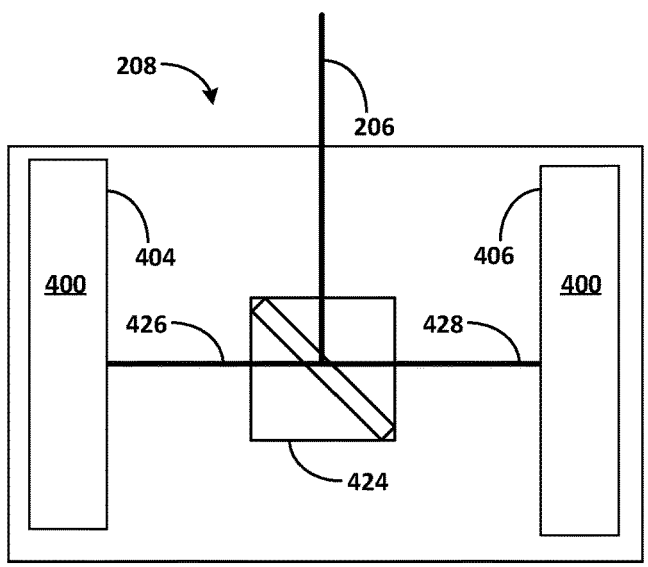

As shown, for example, in FIGS. 4A-4D, a beam sensor 208 may include a single sensor element 400. Alternatively, as shown, for example, in FIG. 4D, a beam sensor 208 may include a plurality of sensor elements 400, such as a first sensor element 404 and a second sensor element 406. The first sensor element 404 may include one or more photoreceptor sets 402, and/or the second sensor element 406 may include one or more photoreceptor sets 402. For a beam sensor 208 that includes a plurality of sensor elements 400, such as shown in FIG. 4D, the respective sensor elements 400 may be configured as shown in FIG. 4A, FIG. 4B, and/or FIG. 4C. Regardless of the particular configuration of the beam sensor 208, a measurement beam 206 may become incident upon the one or more sensor elements 400, and the one or more sensor elements 400 may be configured to provide a signal from which one or more parameters of the measurement beam 206 may be determined. For example, the one or more parameters of the measurement beam 206 may be utilized to determine providing position information that may be utilized to determine position information of an energy beam 144 from which the measurement beam 206 was extracted.

In some embodiments, as shown, for example, in FIGS. 4B and 4C, a sensor element 400 may include a measurement beam-splitter 408 configured to split a measurement beam 206, providing a first measurement beam portion 410 and a second measurement beam portion 412. In some embodiments, a beam sensor 208 may have an interferometer-type configuration. As shown in FIG. 4B, the first measurement beam portion 410 may become incident upon a first photoreceptor set 414, and/or the second measurement beam portion 412 may become incident upon a second sensor element 406. The first photoreceptor set 414 may be configured to determine a first one or more parameters of the measurement beam 206 (e.g., from the first measurement beam portion 410) and/or the second photoreceptor set 416 may be configured to determine a second one or more parameters of the measurement beam 206 (e.g., from the second measurement beam portion 412). The sensor element 400 may be configured to determine an axial orientation of the measurement beam 206, for example, from the first measurement beam portion 410 detected by the first photoreceptor set 414. Additionally, or in the alternative, the sensor element 400 may be configured to determine an angular orientation of the measurement beam 206, for example, from the second measurement beam portion 412 detected by the second photoreceptor set 416. As shown in FIG. 4C, the first measurement beam portion 410 and the second measurement beam portion 412 may become incident upon a common photoreceptor set 402. The first measurement beam portion 410 may be reflected onto the photoreceptor set 402 at least in part by a first measurement beam reflector 418, and/or the second measurement beam portion 412 may be reflected onto the photoreceptor set 402 at least in part by a second measurement beam reflector 420. The first measurement beam portion 410 and the second measurement beam portion 412 may be directed onto different regions of the photoreceptor set 402. The axial orientation and the angular orientation of the measurement beam 206 may be differentiated from one another based at least in part on a difference in beam path lengths as between the first measurement beam portion 410 and the second measurement beam portion 412, and/or based at least in part on a location upon which the first measurement beam portion 410 and the second measurement beam portion 412 become incident upon the respective photoreceptor set 402. The axial orientation and/or the angular orientation of the measurement beam 206 may be utilized to determine an axial orientation and/or an angular orientation of the energy beam 144. In some embodiments, the first measurement beam portion 410 and the second measurement beam portion 412 may have different beam path lengths.

In some embodiments, a first adjustment to an orientation of an energy beam 144 may be performed followed by a second adjustment to the orientation of the energy beam 144. The first adjustment may be performed with respect to an axial orientation of an energy beam 144. The second adjustment may be performed with respect to an angular orientation of the energy beam 144. The first adjustment may be performed based at least in part on sensor information from a first photoreceptor set 414 (e.g., FIG. 4B) and/or a first portion of a common photoreceptor set 402 (e.g., FIG. 4C). Additionally, or in the alternative, the second adjustment may be performed based at least in part on sensor information from a second photoreceptor set 416 (e.g., FIG. 4B) and/or a second portion of a common photoreceptor set 402 (e.g., FIG. 4C). The sensor information for the first adjustment and the second adjustment may be obtained from a common beam sensor 208, or the sensor information for the first adjustment may be obtained from a first beam sensor 240 and the second adjustment may be obtained from a second beam sensor 242.

A beam positioning element 202 may be configured to adjust axial orientation of the energy beam and/or an angular orientation of an energy beam based at least in part on the sensor information. In some embodiments, a first beam positioning element 236 may be configured to adjust an axial orientation of the energy beam 144. Additionally, or in the alternative, a second beam positioning element 238 may be configured to adjust an angular orientation of the energy beam 144.

In some embodiments, a beam sensor 208 may include one or more sensor elements 400 configured to provide automatic gain control. The automatic gain control may allow the respective sensor elements 400 to utilize measurement beams 206 that have a wide range of intensity and/or power levels. For example, a sensor element 400 configured to provide automatic gain control may allow a respective photoreceptor set 402 to provide a signal within a suitable amplitude for measurement beams across a wide range of intensity and/or power levels. For example, the automatic gain control may allow a photoreceptor set 402 to provide a suitable signal for a measurement beam 206 corresponding to a calibration power level and/or a manufacturing power level. In some embodiments, the automatic gain control may be provided by a variable gain amplifier 422. The variable gain amplifier may be integrated into a photoreceptor set 402, such as in the form of an optical integrated circuit. The variable gain amplifier 422 may include any suitable amplifier. In some embodiments, the variable gain amplifier 422 may include a digitally controlled amplifier. The digitally controlled amplifier may be integrated into a photoreceptor set 402, such as in the form of an optical integrated circuit, including, for example, a series of stepped feedback resistors that respectively provide desired gain settings. In some embodiments, the digitally controlled amplifier may include a plurality of resistor sets, such as a first resistor set configured to provide a first gain setting corresponding to a calibration power level, and/or a second resistor set configured to provide a second gain setting corresponding to a manufacturing power level. The photoreceptor set 402 may include a microcontroller configured to toggle between respective resistor sets to provide a desired gain level. In still further embodiments, a variable gain amplifier 422 may additionally or alternatively include a voltage-controlled resistor, an operational transconductance amplifier, an inverting amplifier, or a non-inverting amplifier.

In addition, or in the alternative to providing a variable gain amplifier 422, a beam sensor 208 may include a plurality of sensor elements 400, as shown, for example in FIG. 4D. In some embodiments, the beam sensor 208 may include a beam switch 424 configured to alternatively direct a measurement beam 206 to respective ones of a plurality of sensor elements 400. The respective sensor elements 400 may be configured for use with a measurement beam 206 within a specified range of intensities or power levels. For example, a first sensor element 404 may be configured for use with a measurement beam 206 that has an intensity and/or power level corresponding to a calibration power level, and/or a second sensor element 406 may be configured for use with a measurement beam 206 that has an intensity and/or power level corresponding to a manufacturing power level. The beam switch 424 may be configured to direct the measurement beam 206 along a first measurement beam path 426 to the first sensor element 404 such that the first sensor element 404 may be utilized during a calibration operation, such as when the energy beam 144 may exhibit a calibration power level that is relatively lower than the power level of the energy beam during a manufacturing operation, such as at least one order of magnitude lower than the power level of the energy beam during a manufacturing operation. Additionally, or in the alternative, beam switch 424 may be configured to direct the measurement beam 206 along a second measurement beam path 428 to the second sensor element 406 such that the second sensor element 406 may be utilized during a manufacturing operation, such as when the energy beam 144 may exhibit a manufacturing power level that is relatively higher than the power level of the energy beam during a calibration operation, such as at least one order of magnitude higher than the power level of the energy beam during a calibration operation.

Figure 5A:
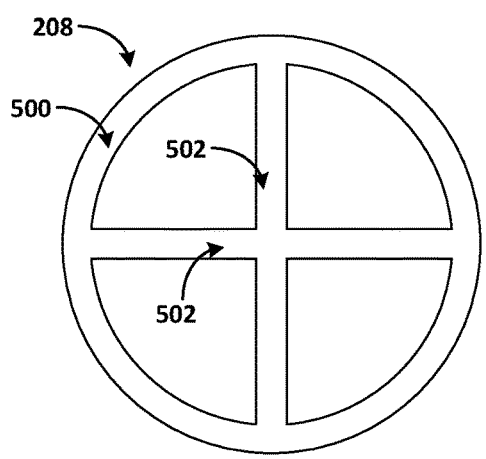
FIGS. 5A-5E schematically depict exemplary targets and resulting beam patterns that may be utilized with exemplary beam sensors.
Figure 5B:
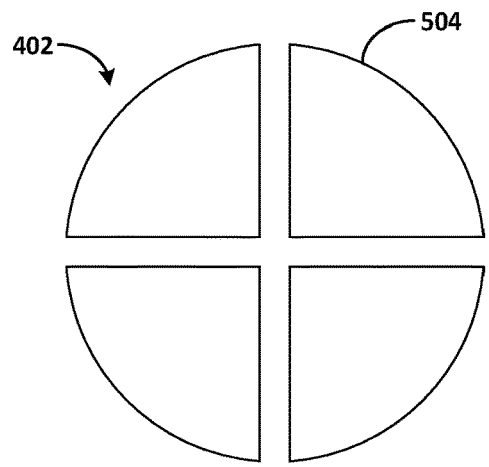
Figure 5C:
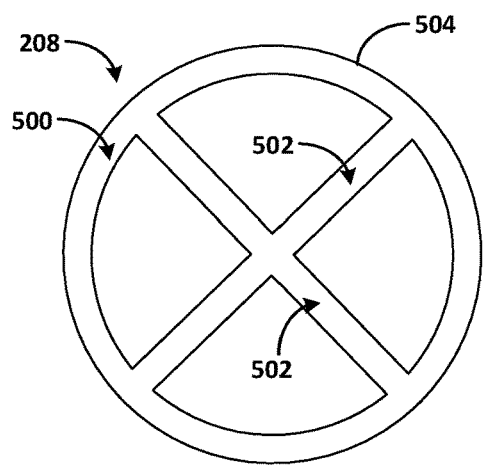
Figure 5D:
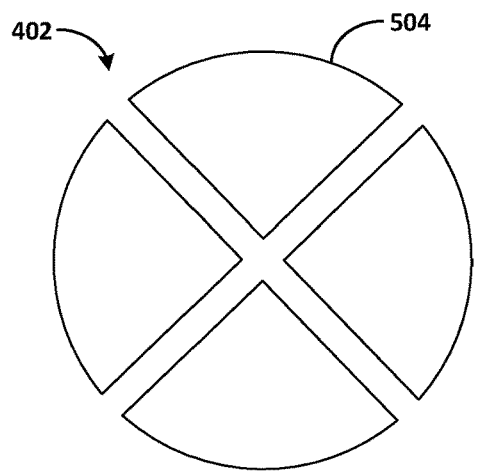
Figure 5E:
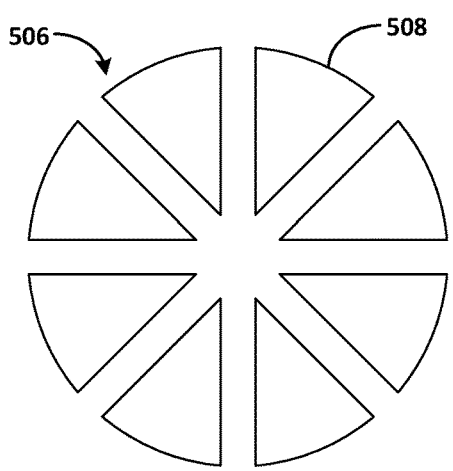

Now referring to FIGS. 5A-5E, in some embodiments, a beam sensor may include one or more targets 500 configured to assist with determining one or more properties of an energy beam 144. The one or more targets 500 may have known geometry configured to obstruct at least a portion of a measurement beam 206. One or more parameters of the measurement beam 206 incident upon a beam sensor 208 may be determined, such as an axial and/or angular orientation of the measurement beam 206, based at least in part by known geometry of the one or more targets 500. In some embodiments, a target 500 may include one or more crosshairs 502 configured to intersect at least a portion of the measurement beam 206, such as a vertical crosshair 502 and/or a horizontal crosshair 502 as shown in FIG. 5A, and/or one or more diagonal crosshairs 502 as shown in FIG. 5C. A measurement beam 206 may become incident upon an incident region 504 of a beam sensor 208, such as an incident region 504 of a photoreceptor set 402, as shown. The incident region 504 may correspond to a portion of the measurement beam 206 unobstructed by the target. For example, FIG. 5B shows an incident region 504 corresponding to the target shown in FIG. 5A, and FIG. 5D shows an incident region 504 corresponding to the target shown in FIG. 5C.

In some embodiments, a beam sensor 208 may include a first target 500 (e.g. FIG. 5A) that corresponds to a sensor element 400 configured to receive a first measurement beam 244 and/or a first measurement beam portion 410, and a second target 500 (e.g., FIG. 5C) that corresponds to a sensor element 400 configured to receive a second measurement beam 246 and/or a second measurement beam portion 412. Additionally, or in the alternative, a first beam sensor 208 and/or a first sensor element 400 may include a first target 500 (e.g. FIG. 5A) that corresponds to a sensor element 400 configured to receive a first measurement beam 244 and/or a first measurement beam portion 410. A second beam sensor 208 and/or a second sensor element 400 may include a second target 500 (e.g., FIG. 5C) that corresponds to a sensor element 400 configured to receive a second measurement beam 246 and/or a second measurement beam portion 412. In some embodiments, a first target 500 may be configured as an axial orientation target and/or a second target 500 may be configured as an angular orientation target. An axial orientation target may be configured to determine an axial orientation of a measurement beam 206, from which an axial orientation of an energy beam 144 may be determined. An angular orientation target may be configured to determine an angular orientation of a measurement beam 206, from which an angular orientation of an energy beam 144 may be determined. Data from a first incident region 504 (e.g., FIG. 5B) and data from a second incident region 504 (e.g., FIG. 5D) may be superimposed to provide a superimposed incident region 506 as shown, for example, in FIG. 5E. The superimposed incident region 506 may include a plurality of overlapping incident regions 508. One or more parameters of the measurement beam 206 may be determined, such as an axial and/or angular orientation of the measurement beam 206, based at least in part on the superimposed incident region 506 and/or respective ones of the plurality of overlapping incident regions 508.

In some embodiments, the presently disclosed energy beam systems 134, irradiation devices 142, and/or methods may provide an energy beam 144 with an improved quality. The improved quality may be attributable at least in part to improved beam alignment with an optical axis of the irradiation device 142, and/or to adjustments made to one or more beam quality parameters, such as after having aligned the energy beam 144 with the optical axis of the irradiation device 142. Exemplary beam quality parameters that may be adjusted include: beam profile, waist position, intensity, caustic, spot size, and/or focal length, as well as combinations of these. The quality of an energy beam 144, and/or an improvement in the quality of the energy beam 144, may be described with reference to a beam quality factor ($M^2$) according to ISO Standard 11146. The beam quality factor ($M^2$) represents a variation of a beam from a diffraction-limited Gaussian beam with the same wavelength. The beam quality factor ($M^2$) may be described according to the following relationship: $\theta = M^2 \lambda / \pi W_0$, where ($\theta$) is the half-angle beam divergence, ($W_0$) is the beam radius at the beam waist, ($\lambda$) is the wavelength. A diffraction-limited Gaussian beam has an $M^2$ value of 1.0. In some embodiments, the presently disclosed energy beam systems 134, irradiation devices 142, and/or methods may provide an energy beam 144 with an $M^2$ value of from about 1.05 to about 2.0, such as from about 1.05 to about 1.5, such as from about 1.05 to about 1.2, or such as from about 1.05 to about 1.15.

Figure 6:
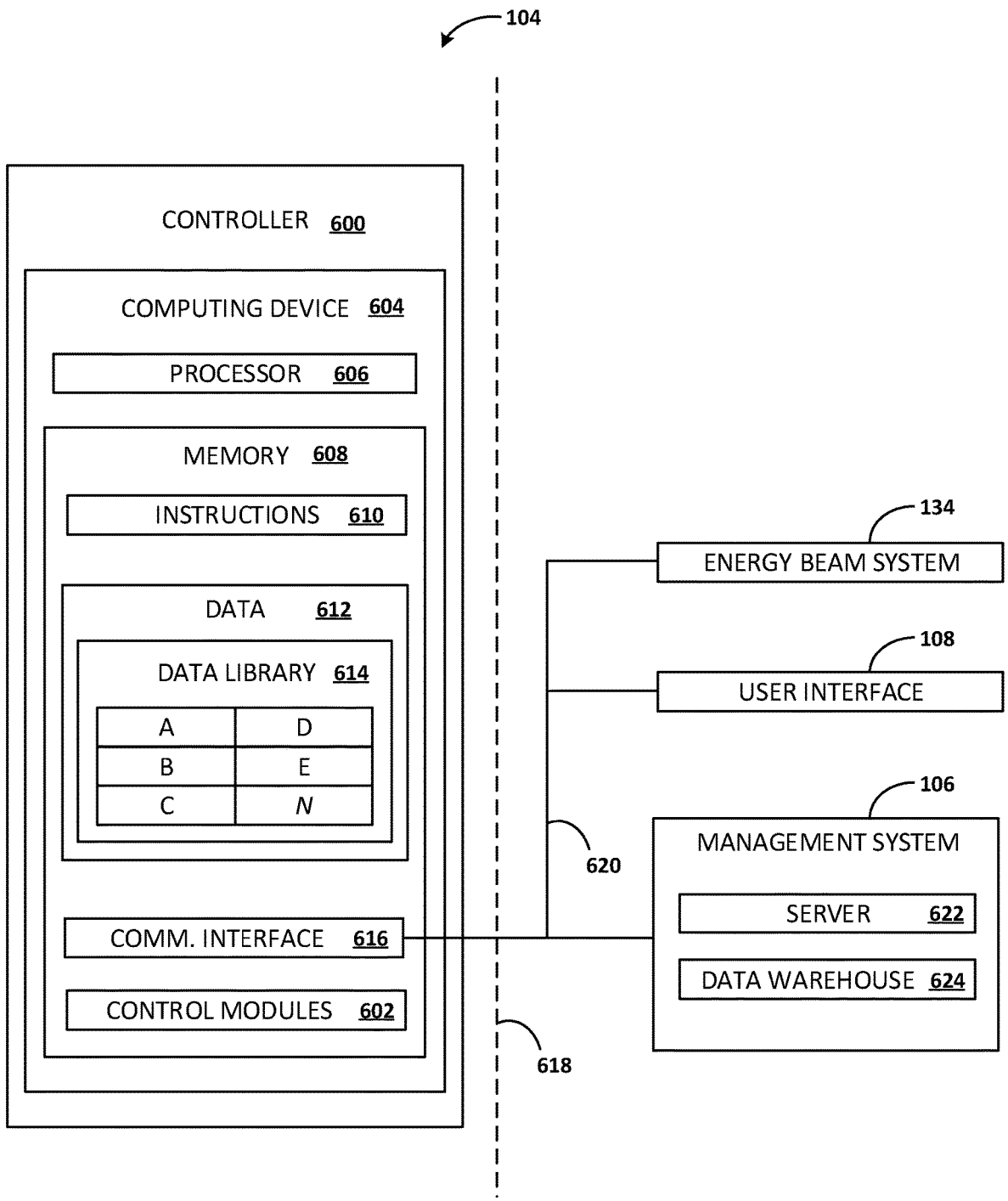
FIG. 6 schematically depicts an exemplary controls system that may be configured to control an additive manufacturing system or machine.

Now turning to FIG. 6, and exemplary control system 104 is further described. A control system 104 may be configured to perform one or more control operations associated with an additive manufacturing system 100 and/or an additive manufacturing machine 102. The control operations may include, one or more control commands may be configured to control operations of an energy beam system 134 and/or an irradiation device 142. As shown in FIG. 6, an exemplary control system 104 includes a controller 600. The controller may include one or more control modules 602 configured to cause the controller 600 to perform one or more control operations. The one or more control modules 602 may include control logic executable to provide control commands configured to control one or more controllable components associated with an additive manufacturing machine 102, such as controllable components associated with an energy beam system 134 and/or an imaging system 158. For example, a control module 602 may be configured to provide one or more control commands executable to control operation of one or more components of an energy beam system 134 and/or an irradiation device 142, such as operation of one or more beam positioning elements 202, one or more beam sensors 208, one or more collimator positioning element 234, and/or any one or more other components of an irradiation device 142.

The controller 600 may be communicatively coupled with an additive manufacturing machine 102. The controller 600 may be communicatively coupled with one or more components of an additive manufacturing machine 102, such as one or more components of an energy beam system 134 and/or an irradiation device 142, such as operation of one or more beam positioning elements 202, one or more beam sensors 208, one or more collimator positioning element 234, and/or any one or more other components of an irradiation device 142. The controller 600 may also be communicatively coupled with a management system 106 and/or a user interface 108.

The controller 600 may include one or more computing devices 604, which may be located locally or remotely relative to an additive manufacturing machine 102, an energy beam system 134, and/or an irradiation device 142. The one or more computing devices 604 may include one or more processors 606 and one or more memory devices 608. The one or more processors 606 may include any suitable processing device, such as a microprocessor, microcontroller, integrated circuit, logic device, and/or other suitable processing device. The one or more memory devices 608 may include one or more computer-readable media, including but not limited to non-transitory computer-readable media, RAM, ROM, hard drives, flash drives, and/or other memory devices 608.

As used herein, the terms "processor" and "computer" and related terms, such as "processing device" and "computing device", are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. A memory device 608 may include, but is not limited to, a non-transitory computer-readable medium, such as a random access memory (RAM), and computer-readable nonvolatile media, such as hard drives, flash memory, and other memory devices. Alternatively, a floppy disk, a compact disc-read only memory (CD-ROM), a magneto-optical disk (MOD), and/or a digital versatile disc (DVD) may also be used.

As used herein, the term "non-transitory computer-readable medium" is intended to be representative of any tangible computer-based device implemented in any method or technology for short-term and long-term storage of information, such as, computer-readable instructions, data structures, program modules and submodules, or other data in any device. The methods described herein may be encoded as executable instructions embodied in a tangible, non-transitory, computer readable media, including, without limitation, a storage device and/or a memory device. Such instructions, when executed by a processor, cause the processor to perform at least a portion of the methods described herein. Moreover, as used herein, the term "non-transitory computer-readable medium" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

The one or more memory devices 608 may store information accessible by the one or more processors 606, including computer-executable instructions 610 that can be executed by the one or more processors 606. The instructions 610 may include any set of instructions which when executed by the one or more processors 606 cause the one or more processors 606 to perform operations, including optical element monitoring operations, maintenance operations, cleaning operations, calibration operations, and/or additive manufacturing operations.

The memory devices 608 may store data 612 accessible by the one or more processors 606. The data 612 can include current or real-time data 612, past data 612, or a combination thereof. The data 612 may be stored in a data library 614. As examples, the data 612 may include data 612 associated with or generated by an additive manufacturing system 100 and/or an additive manufacturing machine 102, including data 612 associated with or generated by the controller 600, an additive manufacturing machine 102, an energy beam system 134, an imaging system 158, a management system 106, a user interface 108, and/or a computing device 604, such as operational data 612 and/or calibration data 612 pertaining thereto. The data 612 may also include other data sets, parameters, outputs, information, associated with an additive manufacturing system 100 and/or an additive manufacturing machine 102.

The one or more computing devices 604 may also include a communication interface 616, which may be used for communications with a communication network 618 via wired or wireless communication lines 620. The communication interface 616 may include any suitable components for interfacing with one or more network(s), including for example, transmitters, receivers, ports, controllers, antennas, and/or other suitable components. The communication interface 616 may allow the computing device 604 to communicate with various nodes on the communication network 618, such as nodes associated with the additive manufacturing machine 102, the energy beam system 134, the imaging system 158, the management system 106, and/or a user interface 108. The communication network 618 may include, for example, a local area network (LAN), a wide area network (WAN), SATCOM network, VHF network, a HF network, a Wi-Fi network, a WiMAX network, a gate-link network, and/or any other suitable communication network 618 for transmitting messages to and/or from the controller 600 across the communication lines 620. The communication lines 620 of communication network 618 may include a data bus or a combination of wired and/or wireless communication links.

The communication interface 616 may allow the computing device 604 to communicate with various components of an additive manufacturing system 100 and/or an additive manufacturing machine 102 communicatively coupled with the communication interface 616 and/or communicatively coupled with one another. The communication interface 616 may additionally or alternatively allow the computing device 604 to communicate with the management system 106 and/or the user interface 108. The management system 106 may include a server 622 and/or a data warehouse 624. As an example, at least a portion of the data 612 may be stored in the data warehouse 624, and the server 622 may be configured to transmit data 612 from the data warehouse 624 to the computing device 604, and/or to receive data 612 from the computing device 604 and to store the received data 612 in the data warehouse 624 for further purposes. The server 622 and/or the data warehouse 624 may be implemented as part of a control system 104 and/or as part of the management system 106.

Figure 7:
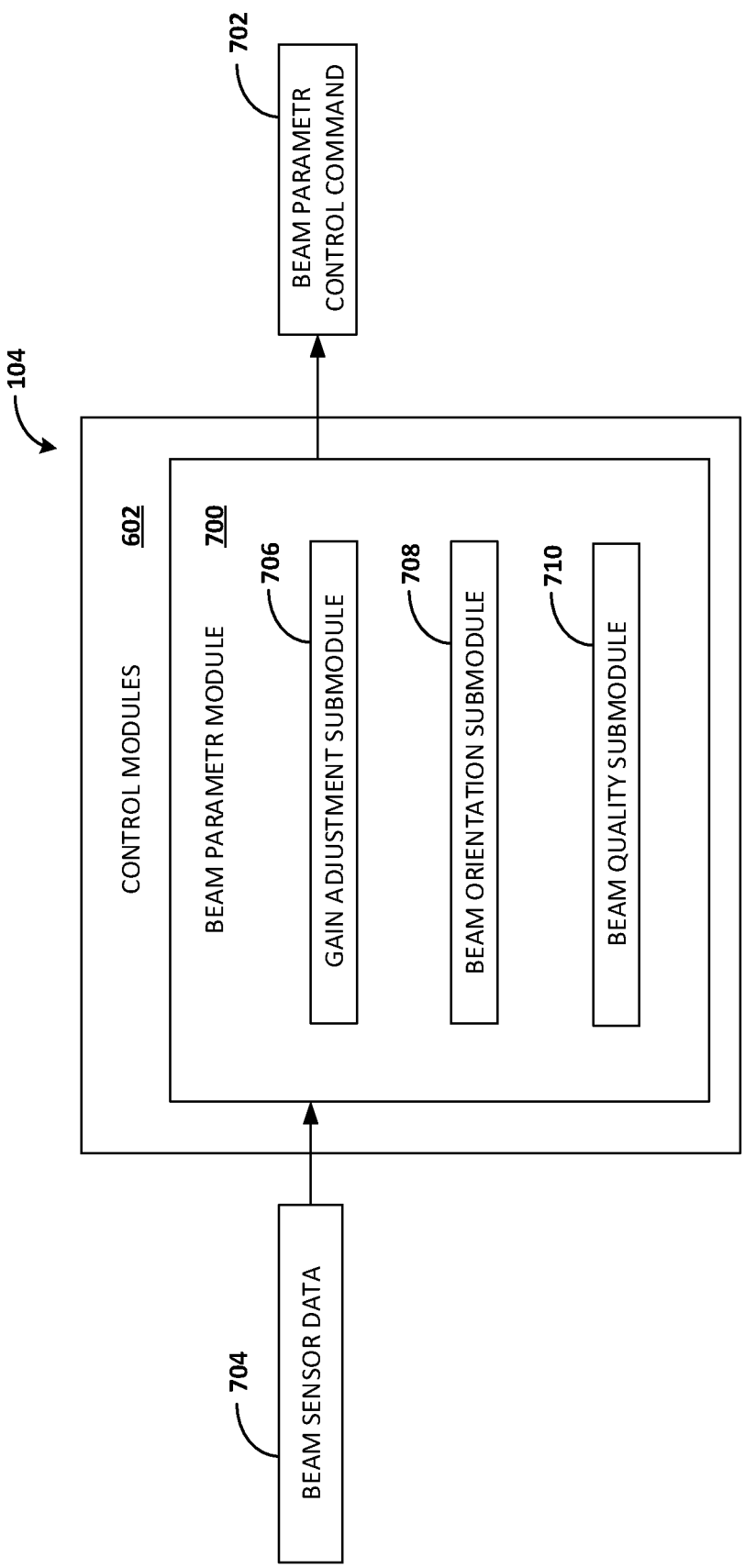
FIG. 7 schematically depicts an exemplary beam parameter module that may be utilized by a control system for an additive manufacturing system or machine.

FIG. 7 schematically depicts an exemplary beam parameter module 700 that may be utilized by a control system 104 associated with an irradiation device 142 of an additive manufacturing machine 102. The beam parameter module 700 may be configured to provide beam parameter control commands 702. The beam parameter control commands 702 may be determined by the beam parameter module 700 based at least in part on beam sensor data 704. The beam parameter module 700 may receive the beam sensor data 704 directly or indirectly from one or more beam sensors 208. The beam parameter module 700 may include one or more submodules that may be utilized individually or in combination. The beam parameter control commands 702 may be determined based at least in part one or more of the beam alignment submodules.

An irradiation device 142 may be configured to perform one or more beam alignment operations, for example, in accordance with beam parameter control commands 702 from a beam parameter module 700. The beam alignment operations may include calibrating alignments and/or manufacturing alignment. An irradiation device 142 may be configured to perform a calibrating alignment prior to additively manufacturing at least a portion of a three-dimensional object 114. A calibrating alignment may include performing one or more beam alignment operations with an energy beam 144 emitted by the irradiation device 142 exhibiting a calibration power level. An irradiation device 142 may be configured to perform a manufacturing alignment during additively manufacturing at least the portion of the three-dimensional object 114. The manufacturing alignment may include performing one or more beam alignment operations with an energy beam 144 emitted by the irradiation device 142 exhibiting a manufacturing power level. The one or more beam alignment operations may be determined based at least in part on one or more parameters of a measurement beam 206, for example, according to beam sensor data 704.

By way of example, the beam parameter module may include a gain adjustment submodule 706, a beam orientation submodule 708, and/or a beam quality submodule 710. A gain adjustment submodule 706 may be configured to determine a gain value for one or more beam sensors 208, to select a sensor element 400 from among a plurality of sensor elements 400, and/or to determine a position for a beam switch 424 configured to direct a measurement beam 206 to a respective sensor element 400. A beam orientation submodule 708 may be configured to determine one or more beam orientation parameters of an energy beam 144 based at least in part on data from one or more beam sensors 208, such as data corresponding to an incident region 504 of a sensor element 400 and/or data corresponding to a superimposed incident region 506 and/or a plurality of overlapping incident regions 508. For example, a beam orientation submodule may be configured to determine an axial orientation and/or an angular orientation of the energy beam 144. A beam quality submodule 710 may be configured to determine one or more quality parameters of an energy beam 144, such as beam profile, waist position, intensity, caustic, spot size, focal length, and so forth, as well as combinations of these. The one or more quality parameters may be determined by the beam quality submodule 710 based at least in part on data from the one or more beam sensors 208.

The beam parameter control commands 702 may be configured to adjust a gain value for a beam sensor 208, to activate a sensor element 400 from among a plurality of sensor elements 400, and/or to actuate a beam switch 424 configured to direct a measurement beam 206 to a respective sensor element 400. Additionally, or in the alternative, the beam parameter control commands 702 may be configured to adjust one or more beam orientation parameters of an energy beam 144 based at least in part on data from a beam sensor 208, for example, at least in part by adjusting a position of the one or more beam positioning elements 202 based at least in part on position information determined with the one or more beam sensors 208. The adjustments to the one or more beam positioning elements 202 imparted by the beam parameter control commands 702 may be configured to align the energy beam 144 at least partially with an optical axis of the irradiation device 142. Additionally, or in the alternative, the beam parameter control commands 702 may be configured to adjust one or more quality parameters of an energy beam 144, such as beam profile, waist position, intensity, caustic, spot size, focal length, and so forth, as well as combinations of these. The one or more quality parameters may be adjusted in accordance with beam parameter control commands 702 by determined based at least in part on data from the one or more beam sensors 208.

Now turning to FIGS. 8A-8C, exemplary methods 800 of additively manufacturing a three-dimensional object will be described with reference to flow charts. Exemplary methods 800 may include any one or more elements described with respect to respective blocks in the flow chart. Respective parts of the method may be performed in a single step or in a plurality of steps, in sequence or in parallel, and/or in order or out of order, as may be desired. Exemplary methods may be performed at least in part by a control system 104, and/or one or more control modules 602 associated with the control system 104. Additionally, or in the alternative, exemplary methods may be performed at least in part by an additive manufacturing system and/or an additive manufacturing machine 102, for example, by a control system 104 associated therewith. The portions of the method described with reference to FIG. 8A, FIG. 8B, and FIG. 8C may be performed in combination with one another and/or as separate respective methods.

Figure 8A:
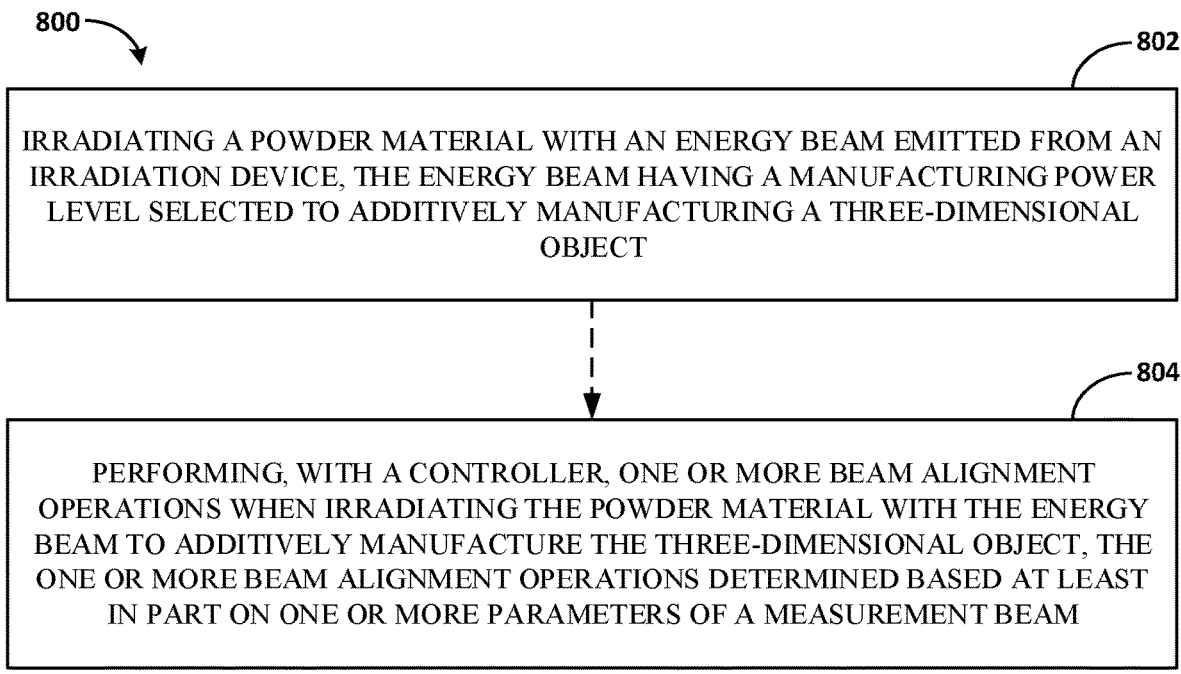
FIGS. 8A-8C schematically depict exemplary methods of additively manufacturing a three-dimensional object.

As shown in FIG. 8A, an exemplary method 800 may include, at block 802, irradiating a powder material 120 with an energy beam 144 emitted from an irradiation device 142. The energy beam 144 may have a manufacturing power level selected to additively manufacturing a three-dimensional object 114. At block 804, an exemplary method 800 may include performing, with a controller 600, one or more beam alignment operations when irradiating the powder material 120 with the energy beam 144 to additively manufacture the three-dimensional object 114. The one or more beam alignment operations may be determined based at least in part on one or more parameters of a measurement beam 206.

Figure 8B:
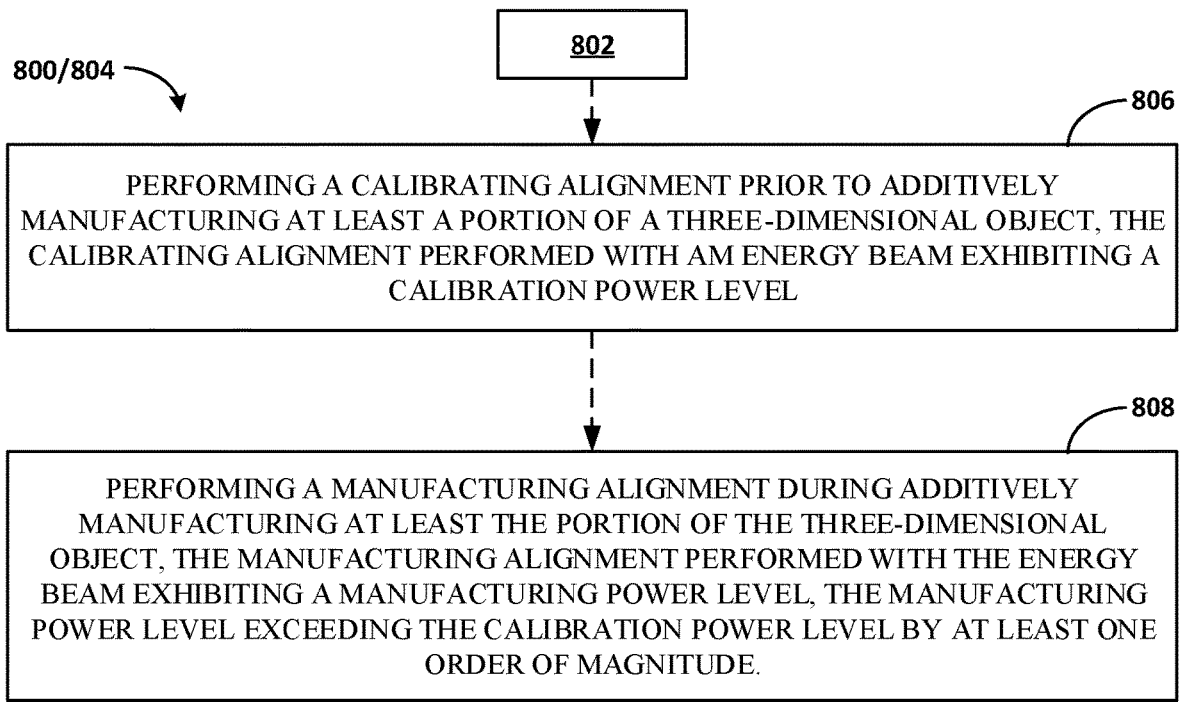

As shown in FIG. 8B, an exemplary method 800 may include performing one or more beam alignment operations, including a calibrating alignment and/or a manufacturing alignment. For example, an exemplary method 800 may include, at block 806, performing a calibrating alignment prior to additively manufacturing at least a portion of the three-dimensional object 114. The calibrating alignment may be performed with the energy beam 144 exhibiting a calibration power level. Additionally, or in the alternative, an exemplary method 800 may include, at block 808, performing a manufacturing alignment during additively manufacturing at least the portion of the three-dimensional object 114. The manufacturing alignment may be performed with the energy beam 144 exhibiting a manufacturing power level. The manufacturing power level may exceed a calibration power level by at least one order of magnitude. The manufacturing calibration may be performed while the energy beam 144 is actively melting and/or sintering the powder material 120.

Figure 8C:
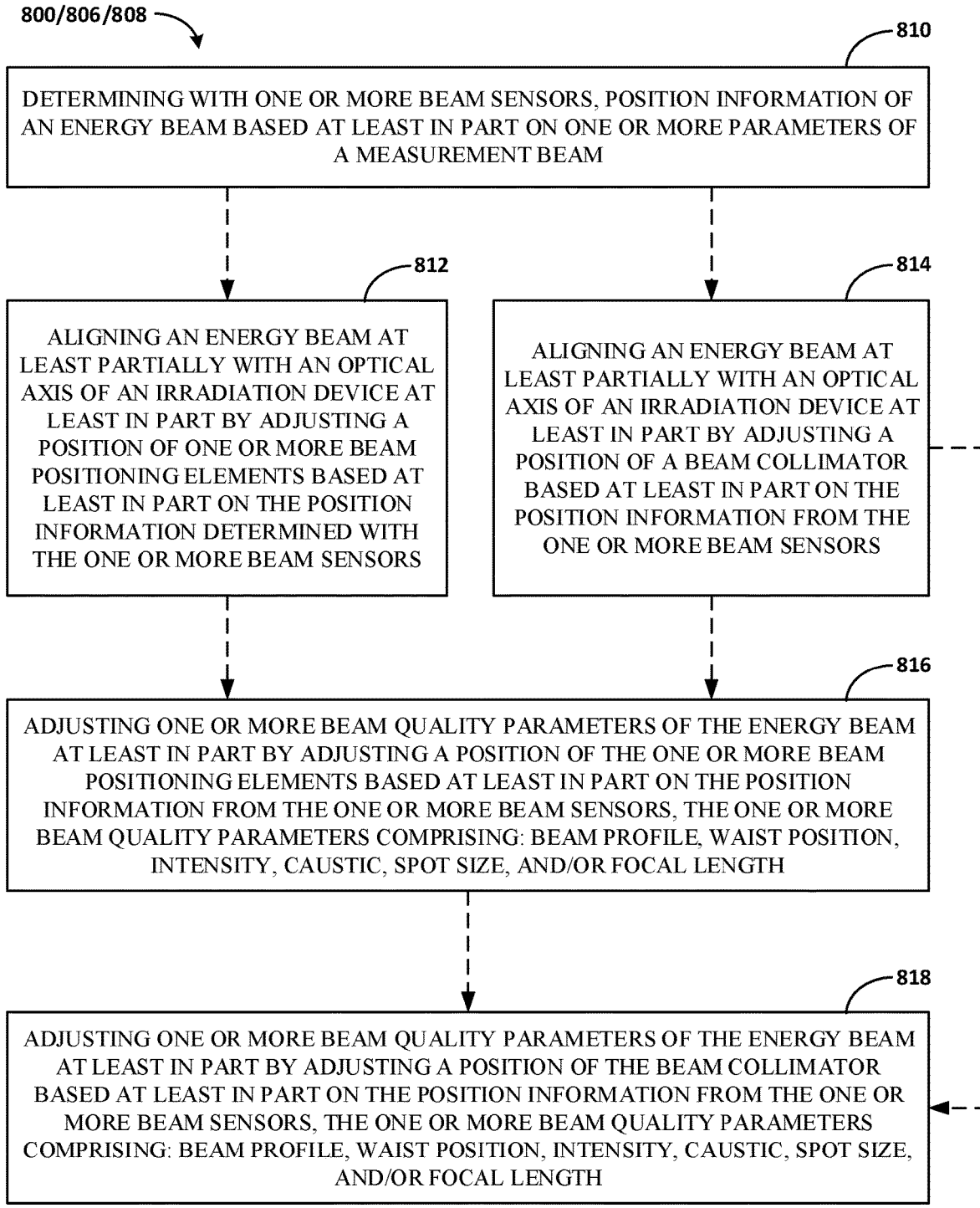

Referring to FIG. 8C, an exemplary method 800 is further described. The flow chart shown in FIG. 8C may illustrate portions of a method 800 that may be performed in connection with the flow chart shown in FIG. 8A and/or FIG. 8B. For example, the flow chart shown in FIG. 8C may illustrate portions of a method 800 that may be performed in connection with a beam alignment operation described with reference to FIG. 8A (e.g., at block 804). Additionally, or in the alternative, the flow chart shown in FIG. 8C may illustrate portions of a method 800 that may be performed in connection with a calibrating alignment (e.g., at block 806) and/or in connection with a manufacturing alignment (e.g., at block 808) described with reference to FIG. 8B. Additionally, or in the alternative, the flow chart shown in FIG. 8C may represent a method 800 performed independently from the subject matter described with reference to FIGS. 8A and 8B.

As shown in FIG. 8C, an exemplary method 800 may include, at block 810, determining with one or more beam sensors 208, position information of an energy beam 144 based at least in part on one or more parameters of a measurement beam 206. At block 812, an exemplary method 800 may include aligning the energy beam 144 at least partially with an optical axis of an irradiation device 142 at least in part by adjusting a position of one or more beam positioning elements 202 based at least in part on the position information determined with the one or more beam sensors 208. Additionally, or in the alternative, an exemplary method 800 may include, at block 814, aligning an energy beam 144 at least partially with an optical axis of an irradiation device 142 at least in part by adjusting a position of a beam collimator 214 based at least in part on the position information from the one or more beam sensors 208. The one or more beam positioning elements 202 and/or the beam collimator 214 may be configured to at least partially align an axial orientation of the energy beam 144 with the optical axis of the irradiation device 142. Additionally, or in the alternative, the one or more beam positioning elements 202 and/or the beam collimator 214 may be configured to at least partially align an angular orientation of the energy beam 144 with the optical axis of the irradiation device 142.

At block 816, an exemplary method 800 may include adjusting one or more beam quality parameters of the energy beam 144 at least in part by adjusting a position of the one or more beam positioning elements 202 based at least in part on the position information from the one or more beam sensors. Additionally, or in the alternative, an exemplary method 800 may include, at block 818, adjusting one or more beam quality parameters of the energy beam 144 at least in part by adjusting a position of the beam collimator 214 based at least in part on the position information from the one or more beam sensors 208. The one or more beam quality parameters may include: beam profile, waist position, intensity, caustic, spot size, and/or focal length, as well as combinations of these.

Further aspects of the presently disclosed subject matter are provided by the following clauses:

1. A system for additively manufacturing a three-dimensional object, the system comprising: an irradiation device configured to emit an energy beam having a manufacturing power level selected to additively manufacturing a three-dimensional object by irradiating a powder material, the irradiation device comprising a beam source, one or more beam positioning elements disposed downstream from the beam source, a beam splitter disposed downstream from the one or more beam positioning elements, the beam splitter configured to split a measurement beam from the energy beam, and one or more beam sensors configured to determine one or more parameters of the measurement beam, the measurement beam propagating along a measurement path to the one or more beam sensors, and the energy beam propagating along an irradiation path to the powder material; and a controller configured to perform one or more beam alignment operations when irradiating the powder material with the energy beam to additively manufacture the three-dimensional object, the one or more beam alignment operations determined based at least in part on the one or more parameters of the measurement beam; wherein the one or more beam alignment operations comprises: determining with the one or more beam sensors, position information of the energy beam based at least in part on the one or more parameters of the measurement beam; and aligning the energy beam at least partially with an optical axis of the irradiation device at least in part by adjusting a position of the one or more beam positioning elements based at least in part on the position information determined with the one or more beam sensors.

2. The system of any clause herein, wherein the irradiation device comprises: a beam collimator disposed upstream from the one or more beam positioning elements, the beam collimator comprising one or more optical elements configured to collimate the energy beam.

3. The system of any clause herein, wherein the one or more beam alignment operations comprises: aligning the energy beam at least partially with the optical axis of the irradiation device at least in part by adjusting a position of the beam collimator based at least in part on the position information from the one or more beam sensors.

4. The system of any clause herein, wherein the beam collimator comprises a collimator positioning element.

5. The system of any clause herein, wherein the beam source comprises a laser fiber or a laser fiber array, or wherein the beam source comprises a laser diode or a laser diode array.

6. The system of any clause herein, wherein the one or more beam alignment operations comprises: adjusting one or more beam quality parameters of the energy beam at least in part by adjusting a position of the beam collimator based at least in part on the position information from the one or more beam sensors, the one or more beam quality parameters comprising: beam profile, waist position, intensity, caustic, spot size, and/or focal length.

7. The system of any clause herein, wherein the irradiation device comprises: a first beam positioning element configured to adjust an axial orientation of the energy beam; and a second beam positioning element configured to adjust an angular orientation of the energy beam.

8. The system of any clause herein, wherein the one or more beam positioning elements respectively comprise a kinematic optical element.

9. The system of any clause herein, wherein the one or more beam sensors are configured to determine an axial orientation of the energy beam and/or an angular orientation of the energy beam.

10. The system of any clause herein, wherein the one or more beam sensors comprises an interferometer-type configuration.

11. The system of any clause herein, wherein the one or more beam sensors comprises a lateral displacement sensor or a quadrant sensor.

12. The system of any clause herein, wherein the one or more beam sensors comprises one or more targets configured to obstruct at least a portion of the measurement beam.

13. The system of any clause herein, wherein the one or more targets comprises an axial orientation target and/or an angular orientation target.

14. The system of any clause herein, wherein the one or more beam sensors respectively comprises a variable gain amplifier, the variable gain amplifier configured to adjust a gain value of the one or more beam sensors based at least in part on a power level of the energy beam.

15. The system of any clause herein, wherein the one or more beam alignment operations comprises: performing a calibrating alignment prior to additively manufacturing at least a portion of the three-dimensional object, the calibrating alignment performed with the energy beam exhibiting a calibration power level; and performing a manufacturing alignment during additively manufacturing at least the portion of the three-dimensional object, the manufacturing alignment performed with the energy beam exhibiting the manufacturing power level, the manufacturing power level exceeding the calibration power level by at least one order of magnitude.

16. A method of additively manufacturing a three-dimensional object, the method comprising: irradiating a powder material with an energy beam emitted from an irradiation device, the energy beam having a manufacturing power level selected to additively manufacturing a three-dimensional object; and performing, with a controller, one or more beam alignment operations when irradiating the powder material with the energy beam to additively manufacture the three-dimensional object, the one or more beam alignment operations determined based at least in part on one or more parameters of a measurement beam; wherein the irradiation device comprises a beam source, one or more beam positioning elements disposed downstream from the beam source, a beam splitter disposed downstream from the one or more beam positioning elements, the beam splitter configured to split the measurement beam from the energy beam, and one or more beam sensors configured to determine the one or more parameters of the measurement beam, the measurement beam propagating along a measurement path to the one or more beam sensors, and the energy beam propagating along an irradiation path to the powder material; and wherein the one or more beam alignment operations comprises: determining with the one or more beam sensors, position information of the energy beam based at least in part on the one or more parameters of the measurement beam; and aligning the energy beam at least partially with an optical axis of the irradiation device at least in part by adjusting a position of the one or more beam positioning elements based at least in part on the position information determined with the one or more beam sensors.

17. The method of any clause herein, comprising: aligning the energy beam at least partially with the optical axis of the irradiation device at least in part by adjusting a position of a beam collimator based at least in part on the position information from the one or more beam sensors, the beam collimator disposed upstream from the one or more beam positioning elements, and the beam collimator comprising one or more optical elements configured to collimate the energy beam.

18. The method of any clause herein, comprising: adjusting one or more beam quality parameters of the energy beam at least in part by adjusting a position of the beam collimator based at least in part on the position information from the one or more beam sensors, the one or more beam quality parameters comprising: beam profile, waist position, intensity, caustic, spot size, and/or focal length.

19. The method of any clause herein, comprising: performing a calibrating alignment prior to additively manufacturing at least a portion of the three-dimensional object, the calibrating alignment comprising performing the one or more beam alignment operations with the energy beam exhibiting a calibration power level; and performing a manufacturing alignment during additively manufacturing at least the portion of the three-dimensional object, the manufacturing alignment comprising performing the one or more beam alignment operations with the energy beam exhibiting the manufacturing power level, the manufacturing power level exceeding the calibration power level by at least one order of magnitude.

20. The method of any clause herein, wherein the method is performed using the system of any clause herein.

21. A computer-readable medium comprising computer-executable instructions, which when executed by a processor associated with an additive manufacturing machine, causes the additive manufacturing machine to perform a method comprising: irradiating a powder material with an energy beam emitted from an irradiation device, the energy beam having a manufacturing power level selected to additively manufacturing a three-dimensional object; and performing, with a controller, one or more beam alignment operations when irradiating the powder material with the energy beam to additively manufacture the three-dimensional object, the one or more beam alignment operations determined based at least in part on one or more parameters of a measurement beam; wherein the irradiation device comprises a beam source, one or more beam positioning elements disposed downstream from the beam source, a beam splitter disposed downstream from the one or more beam positioning elements, the beam splitter configured to split the measurement beam from the energy beam, and one or more beam sensors configured to determine the one or more parameters of the measurement beam, the measurement beam propagating along a measurement path to the one or more beam sensors, and the energy beam propagating along an irradiation path to the powder material; and wherein the one or more beam alignment operations comprises: determining with the one or more beam sensors, position information of the energy beam based at least in part on the one or more parameters of the measurement beam; and aligning the energy beam at least partially with an optical axis of the irradiation device at least in part by adjusting a position of the one or more beam positioning elements based at least in part on the position information determined with the one or more beam sensors.

22. The computer-readable medium of any clause herein, wherein the computer-readable medium is configured to cause an additive manufacturing machine to perform the method of any clause herein.

23. An additive manufacturing machine configured to perform the method of any clause herein.

This written description uses exemplary embodiments to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for additively manufacturing a three-dimensional object, the system comprising:
  a build plane configured to support one or more layers of a powder material;
  an irradiation device configured to emit an energy beam having a manufacturing power level selected to additively manufacture a three-dimensional object by irradiating the powder material, the irradiation device comprising a beam source, a beam collimator, one or more beam positioning elements disposed downstream from the beam source, wherein the beam collimator includes at least one beam positioning element of the one or more beam positioning elements configured to adjust a position of the collimator, a beam splitter disposed downstream from the one or more beam positioning elements, the beam splitter configured to split a measurement beam from the energy beam, and one or more beam sensors configured to determine one or more parameters of the measurement beam, the measurement beam propagating along a measurement path to the one or more beam sensors, and the energy beam propagating along an irradiation path to the powder material; and a controller configured to perform one or more beam alignment operations when irradiating the powder material with the energy beam to additively manufacture the three-dimensional object, the one or more beam alignment operations determined based at least in part on the one or more parameters of the measurement beam;

wherein the one or more beam alignment operations comprises:

determining with the one or more beam sensors, position information of the energy beam based at least in part on the one or more parameters of the measurement beam; and aligning the energy beam with an optical axis of the irradiation device by adjusting a position of the one or more beam positioning elements, including the at least one beam positioning element of the beam collimator, based at least in part on the position information determined with the one or more beam sensors, wherein adjustment of the position of the at least one beam positioning element of the beam collimator is in a direction transverse to the irradiation path.

2. The system of claim 1, wherein the beam collimator comprises one or more optical elements configured to collimate the energy beam.

3. The system of claim 1, wherein the one or more beam alignment operations comprises:

aligning the energy beam at least partially with the optical axis of the irradiation device at least in part by adjusting a position of the beam collimator based at least in part on the position information from the one or more beam sensors.

4. The system of claim 3, wherein the beam source comprises a laser fiber or a laser fiber array, or wherein the beam source comprises a laser diode or a laser diode array.

5. The system of claim 1, wherein the one or more beam alignment operations comprises:

adjusting one or more beam quality parameters of the energy beam at least in part by adjusting a position of the beam collimator based at least in part on the position information from the one or more beam sensors, the one or more beam quality parameters comprising: beam profile, waist position, intensity, caustic, spot size, and/or focal length.

6. The system of claim 1, wherein the irradiation device comprises:

a first beam positioning element configured to adjust an axial orientation of the energy beam; and a second beam positioning element configured to adjust an angular orientation of the energy beam.

7. The system of claim 1, wherein the one or more beam positioning elements, including the at least one beam positioning element of the beam collimator, respectively comprise a kinematic optical element.

8. The system of claim 1, wherein the one or more beam sensors are configured to determine an axial orientation of the energy beam and/or an angular orientation of the energy beam.

9. The system of claim 1, wherein the one or more beam sensors comprises an interferometer-type configuration.

10. The system of claim 1, wherein the one or more beam sensors comprises a lateral displacement sensor or a quadrant sensor.

11. The system of claim 1, wherein the one or more beam sensors comprises one or more targets configured to obstruct at least a portion of the measurement beam.

12. The system of claim 11, wherein the one or more targets comprises an axial orientation target and/or an angular orientation target.

13. The system of claim 1, wherein the one or more beam sensors respectively comprises a variable gain amplifier, the variable gain amplifier configured to adjust a gain value of the one or more beam sensors based at least in part on a power level of the energy beam.

14. The system of claim 1, wherein the one or more beam alignment operations comprises:

performing a calibrating alignment prior to additively manufacturing at least a portion of the three-dimensional object, the calibrating alignment performed with the energy beam exhibiting a calibration power level; and performing a manufacturing alignment during additively manufacturing at least the portion of the three-dimensional object, the manufacturing alignment performed with the energy beam exhibiting the manufacturing power level, the manufacturing power level exceeding the calibration power level by at least one order of magnitude.

15. The system of claim 1, wherein the one or more beam alignment operations further comprises:

determining with the one or more beam sensors at a first time, initial position information of the energy beam based on the one or more parameters of the measurement beam; and determining that the energy beam is aligned with the optical axis of the irradiation device based on the initial position information, wherein the position information of the energy beam is determined at a second time and is different than the initial position information due to a change in an operating condition of a component of the irradiation device between the first time and the second time.

* * * * *